US012753654B2

(12) United States Patent
Daut

(10) Patent No.: US 12,753,654 B2
(45) Date of Patent: Oct. 6, 2026

(54) SOUND DAMPING DOOR

(71) Applicant: Catalyst Acoustics Group, Inc., Agawam, MA (US)

(72) Inventor: Michael D. Daut, Batavia, IL (US)

(73) Assignee: Catalyst Acoustics Group, Inc., Agawam, MA (US)

( * ) Notice: Subject to any disclaimer, the term of this patent is extended or adjusted under 35 U.S.C. 154(b) by 181 days.

(21) Appl. No.: 18/606,799

(22) Filed: Mar. 15, 2024

(65) Prior Publication Data

US 2024/0218730 A1 Jul. 4, 2024

Related U.S. Application Data

(63) Continuation-in-part of application No. 18/095,060, filed on Jan. 10, 2023, now Pat. No. 12,286,834, (Continued)

(30) Foreign Application Priority Data

Oct. 8, 2019 (CA) ................................ CA 3058114

(51) Int. Cl.

| | |
|---|---|
| ***E06B 1/04*** | (2006.01) |
| ***E06B 1/16*** | (2006.01) |
| ***E06B 1/18*** | (2006.01) |
| ***E06B 1/52*** | (2006.01) |
| ***E06B 3/70*** | (2006.01) |

(Continued)

(52) U.S. Cl.
CPC .................. *E06B 5/20* (2013.01); *E06B 1/16* (2013.01); *E06B 1/18* (2013.01); *E06B 1/52* (2013.01); *E06B 3/7015* (2013.01); *E06B 3/827* (2013.01); *E06B 7/2312* (2013.01); *E06B 7/2316* (2013.01); *E05D 3/06* (2013.01); *E05D 7/00* (2013.01); *E06B 2003/703* (2013.01); *E06B 2003/7051* (2013.01)

(58) Field of Classification Search
CPC ........ E06B 1/52; E06B 7/2312; E06B 7/2316; E06B 7/231
See application file for complete search history.

(56) References Cited

U.S. PATENT DOCUMENTS 1,192,361 A * 7/1916 Wistrom .................. E06B 7/22 49/470
2,089,669 A * 8/1937 Shadford ............. E06B 7/2316 49/470

(Continued)

*Primary Examiner* — Basil S Katcheves
(74) *Attorney, Agent, or Firm* — Harris Beach Murtha Cullina PLLC

(57) ABSTRACT

A sound damping door system having a door frame, a compression seal, a door slab, a bottom seal, and a concealed hinge assembly. The door frame includes male and female components adapted to engage each other in a rough door opening between first and second wall faces; and at least one isolation gasket adapted to be disposed between the male and female components. The compression seal is mounted to the door frame. The door slab includes an outer skin; an arched constrainment sheet inside the outer skin; a damping fill material inside the outer skin; and an acoustic insert inside the outer skin. The bottom seal is mounted to a bottom surface of the door slab such that the bottom seal is permitted to move relative to the door slab.

6 Claims, 15 Drawing Sheets

Related U.S. Application Data which is a continuation of application No. 17/018,465, filed on Sep. 11, 2020, now Pat. No. 11,560,751.

(60) Provisional application No. 63/452,211, filed on Mar. 15, 2023, provisional application No. 62/898,749, filed on Sep. 11, 2019.

(51) Int. Cl.

| | |
|---|---|
| ***E06B 3/82*** | (2006.01) |
| ***E06B 5/20*** | (2006.01) |
| ***E06B 7/23*** | (2006.01) |
| *E05D 3/06* | (2006.01) |
| *E05D 7/00* | (2006.01) |

(56) References Cited

U.S. PATENT DOCUMENTS

| | | | | |
|---|---|---|---|---|
| 2,934,802 | A * | 5/1960 | Shekter | E06B 7/2316 49/470 |
| 3,125,943 | A * | 3/1964 | Geocaris et al. | F24F 13/078 454/293 |
| 3,216,066 | A | 11/1965 | Hadacek | |
| 3,627,547 | A | 12/1971 | Bailey | |
| 3,690,037 | A * | 9/1972 | Kempel | E06B 1/70 49/495.1 |
| 3,987,588 | A | 10/1976 | Imperial et al. | |
| 4,015,368 | A * | 4/1977 | Court | B60J 10/86 49/495.1 |
| 4,179,849 | A | 12/1979 | Kuffner | |
| 4,310,991 | A * | 1/1982 | Seely | E06B 7/2316 49/470 |
| 4,718,195 | A | 1/1988 | Ortega | |
| 4,878,325 | A | 11/1989 | Van Tuyl | |
| 4,926,963 | A | 5/1990 | Snyder | |
| 4,998,598 | A | 3/1991 | Mardian et al. | |
| 5,056,263 | A * | 10/1991 | Bies | E06B 7/2312 49/470 |
| 5,070,651 | A | 12/1991 | Jeter | |
| 5,359,819 | A | 11/1994 | Beyler | |
| 5,371,987 | A * | 12/1994 | Hirsch | E06B 7/2312 49/470 |
| 5,435,104 | A | 7/1995 | Dietrich | |
| 5,700,527 | A | 12/1997 | Fuchs | |
| 5,727,349 | A | 3/1998 | McLaughlin | |
| 5,777,279 | A | 7/1998 | Parker | |
| 5,815,989 | A | 10/1998 | Bennenk | |
| 6,161,363 | A | 12/2000 | Herbst | |
| 6,260,305 | B1 | 7/2001 | Joyce | |
| 6,286,274 | B1 | 9/2001 | McKann | |
| 6,430,779 | B1 | 8/2002 | Goldsmith et al. | |
| 6,482,496 | B1 | 11/2002 | Wycech | |
| 6,520,288 | B1 | 2/2003 | Quam et al. | |
| 6,789,645 | B1 | 9/2004 | Deblander | |
| 6,857,233 | B2 | 2/2005 | Farag | |
| 7,181,891 | B2 | 2/2007 | Surace et al. | |
| D582,053 | S | 12/2008 | Williams | |
| 7,621,083 | B2 | 11/2009 | Smith | |
| 7,654,364 | B2 | 2/2010 | Yamaguchi | |
| 8,181,417 | B2 | 5/2012 | Surace et al. | |
| 8,397,864 | B2 | 3/2013 | Trinianov et al. | |
| 8,418,427 | B2 | 4/2013 | Strickland et al. | |
| 8,495,851 | B2 | 7/2013 | Surace et al. | |
| 8,573,357 | B1 | 11/2013 | Hibbs | |
| 8,613,180 | B2 | 12/2013 | Strickland et al. | |
| 8,640,427 | B2 | 2/2014 | Brigggs, Jr. et al. | |
| 8,713,866 | B2 | 5/2014 | Gadoury | |
| 8,739,498 | B2 * | 6/2014 | Wilkinson | E06B 5/16 52/800.1 |
| 8,850,661 | B2 | 10/2014 | Liermann | |
| 8,875,402 | B1 | 11/2014 | Plummer | |
| 8,925,285 | B2 | 1/2015 | Brewerton | |
| 8,991,137 | B2 | 3/2015 | Molinelli | |
| 9,051,731 | B2 | 6/2015 | Thomas et al. | |
| 9,085,933 | B1 * | 7/2015 | Crittenden | E06B 5/14 |
| 9,109,389 | B1 | 8/2015 | Crittenden | |
| 9,187,945 | B2 | 11/2015 | Back | |
| 9,243,444 | B2 | 1/2016 | Daniels | |
| 9,388,568 | B2 | 7/2016 | Tinianov | |
| 9,816,313 | B2 | 11/2017 | Nelson | |
| 10,113,355 | B2 | 10/2018 | Wann | |
| 10,125,492 | B2 | 11/2018 | Tinianov | |
| 10,132,076 | B2 | 11/2018 | Tinianov | |
| 10,151,137 | B2 | 12/2018 | Glover | |
| 10,174,499 | B1 | 1/2019 | Tinianov et al. | |
| 10,202,794 | B1 | 2/2019 | Careri | |
| 10,246,934 | B2 | 4/2019 | Wang et al. | |
| 10,337,237 | B2 | 7/2019 | Malluck | |
| 10,378,273 | B2 | 8/2019 | Wang | |
| 10,533,369 | B2 | 1/2020 | Dintheer et al. | |
| 10,556,413 | B2 | 2/2020 | Cossins | |
| 11,072,968 | B1 | 7/2021 | Downs, Jr. | |
| 11,098,523 | B2 | 8/2021 | Malluck | |
| 11,365,582 | B1 | 6/2022 | Salvoni | |
| 2003/0046886 | A1 | 3/2003 | Potts | |
| 2005/0086868 | A1 | 4/2005 | Santelli, Jr. | |
| 2006/0048466 | A1 | 3/2006 | Darnell | |
| 2007/0190876 | A1 | 8/2007 | Ogawa et al. | |
| 2009/0056257 | A1 | 3/2009 | Mollinger | |
| 2009/0062413 | A1 | 3/2009 | Adur | |
| 2013/0273323 | A1 | 10/2013 | Yamamoto | |
| 2013/0340926 | A1 | 12/2013 | Liang | |
| 2015/0068836 | A1 | 3/2015 | Duhamel | |
| 2016/0153227 | A1 * | 6/2016 | Martin | B60J 5/0418 49/381 |
| 2016/0186483 | A1 * | 6/2016 | Kroeger | E06B 7/2314 49/493.1 |
| 2018/0135346 | A1 | 5/2018 | Warren | |
| 2018/0223592 | A1 | 8/2018 | Malluck | |
| 2018/0325326 | A1 * | 11/2018 | Hall | A47K 3/30 |
| 2021/0140225 | A1 | 5/2021 | Kobayashi | |
| 2022/0205310 | A1 | 6/2022 | Yamagami | |

* cited by examiner

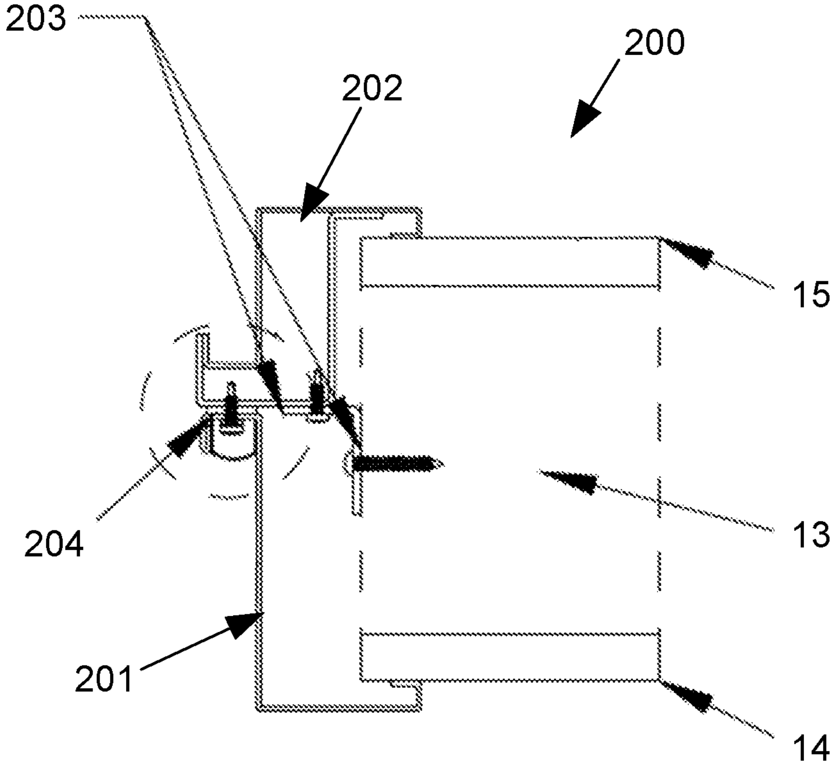
FIG. 7A
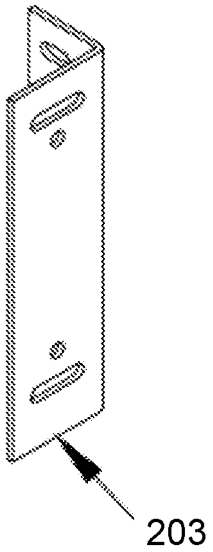
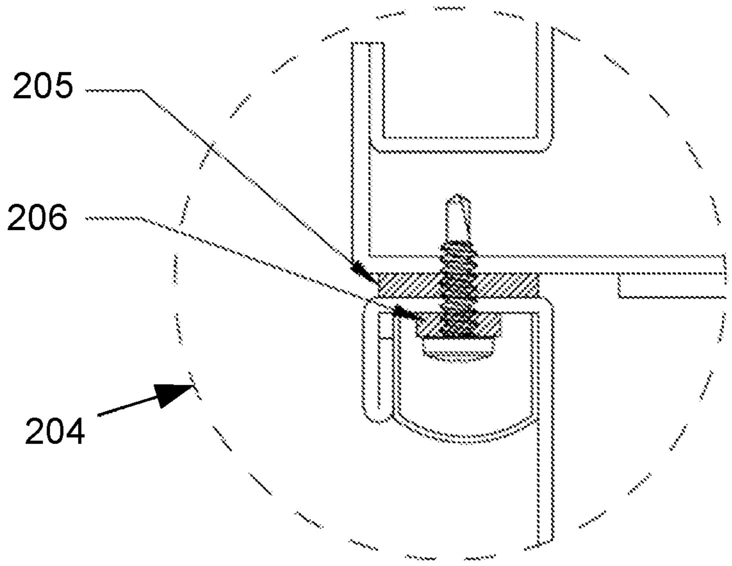
FIG. 7B
FIG. 7C

SOUND DAMPING DOOR

CROSS REFERENCE TO RELATED APPLICATIONS

This application claims the priority benefit of U.S. Provisional Patent Application No. 63/452,211, filed Mar. 15, 2023, and this application is a continuation-in-part application and claims the priority benefit of U.S. patent application Ser. No. 18/095,060, filed Jan. 10, 2023, which is a continuation application and claims the priority benefit of U.S. patent application Ser. No. 17/018,465, filed Sep. 11, 2020, which claimed the priority benefit of U.S. Provisional Patent Application No. 62/898,749, filed Sep. 11, 2019, the contents of which are incorporated by reference herein as if disclosed in their entireties.

FIELD

The present technology relates to the field of sound insulation. Particularly, the present technology relates to sound damping features and techniques for use in building materials, including doors, door frames, and associated hardware.

BACKGROUND

Internal doors present challenges to architects and interior designers working on spaces where sound isolation between rooms is important. The door, door frame, and associated hardware often become the weak link in isolating one room from sounds outside of that room. As a result, typical sound isolation doors are much heavier, bulkier, and more expensive to purchase and install than standard doors. Further, the sound damping techniques employed in typical sound isolation doors are rarely acceptable when balanced against the compromises in cost and aesthetics required by the designer.

For example, FIG. 1A shows a cross-section of a typical sound isolation door design 10 of the prior art. In such prior art designs, resonance cavities 11 exist between orthogonal facing surfaces, which cause acoustic flanking paths that bypass the sealing surfaces in the door. This resonance ultimately reduces the sound transmission loss performance of the door, such that it does not perform to its predicted mass law equivalent.

Constrained dampeners are often made from a highly adhesive polymer (soft isotropic material) combined with a very thin layer of aluminum that plays no part in the dynamic structural rigidity of the base material. As a result, such designs often include Z-channel stiffeners 12 for securing insulation and for improving the stiffness, structural integrity, and, hence, the impact resistance of the door. Metal Z-channel or C-channel strips are often welded to the face of the door skin. This practice actually causes a resonance acoustic signature that is transmitted to the door face. The collision of the stiffener and the door face sheet as they vibrate degrade the transmission loss of the door slab from its intended design target. Furthermore, during an impact event on the face of the door slab, the force is localized to interface between the stiffener and door face, which can drive the material past its yield strength and cause catastrophic failure of the system.

FIG. 1A also shows a standard way of mounting a sound damping door to a rough door opening 13. A female side of the frame is secured on the side of a first wall face 14, and a male side of the frame is secured on the side of a second wall face 15 by being directly connected to both the rough opening and to each other. This direct connection permits sound-induced vibration to be transmitted from the male side to the female side and vice versa.

FIGS. 1B, IC, and ID show different views of a typical prior art bottom seal design 16 often used on sound damping doors. Sometimes referred to as “cam-lift hinge” designs, they use an adjustable seal that has to be fixed in place in slot 17 via pan screw 18 once the door is installed. Because the door moves in a decreasing elevation when it is closed (i.e., the space between the bottom of the door and the floor/threshold surface 19 becomes smaller as the door is closed), the seal has to be compressed by the mass of the door. In many designs, the seal include a polyurethane closed cell foam material 20 disposed in a steel seal pan 21. A neoprene foam layer 22 is attached to the bottom of the seal pan, and a fabric cover 23 is attached to the bottom of the neoprene foam layer. The bottom seal is adjusted to a fixed position 24 with the weight of the door compressing the seal. In many designs, up to 7 psi is required to ensure the seal has enough pressure to properly compress and provide acoustic performance. This significantly adds to the friction force required to open the door. Heavier doors with this type of bottom seal will not pass the ADA 5 lbf pull test.

Therefore, a need exists for a sound damping door design that has improved sound isolating properties. A need also exists for a sound damping door with improved strength and impact resistance. A further need exists for a sound damping door design with an improved bottom seal. There is also a need for a sound damping door design with improved install ability in rough door openings.

SUMMARY

Accordingly, a first embodiment of the present technology provides a door slab including an outer skin, a curved constrainment sheet inside the outer skin, and a damping fill material inside the outer skin. In some embodiments, the constrainment sheet is bonded to the damping fill material.

In some embodiments, the constrainment sheet spans substantially the entire width of the door slab. In some embodiments, the constrainment sheet spans substantially the entire height of the door slab. In some embodiments, the constrainment sheet is arched from a center of the outer skin to first and second ends of the outer skin as measured along the width of the outer skin. In some embodiments, the constrainment sheet is arched between 1 and 2 degrees as measured between a plane of the door slab and a tangent line of the constrainment sheet.

In some embodiments, the constrainment sheet is formed of 22-gauge sheet metal.

In some embodiments, the damping fill material forms a layer on an interior surface of the outer skin, and wherein the constrainment sheet is at least partially embedded in the damping fill material.

In some embodiments, the damping fill material is formed of a blend of a silicone polymer material and a powdered recycled rubber material. In some embodiments, the damping fill material has a combined durometer in the range of Shore 27 to Shore 35 A. In some embodiments, the damping fill material has a combined durometer of Shore 29 A.

In some embodiments, the door slab further includes an acoustic insert inside the outer skin. In some embodiments, the acoustic insert is formed of a 6 pcf material.

In some embodiments, the door slab is adapted to be installed in a door frame. The door frame including a male component adapted to engage with a first wall face; a female component adapted to engage with a second wall face, wherein the male and female components are adapted to engage each other in a rough door opening between the first and second wall faces; at least one angle bracket having a first panel for securing to the rough door opening and a second panel for securing to at least one of the male and female component; and at least one isolation gasket adapted to be disposed between the male and female components. In some embodiments, the door frame further includes a compression seal mounted to at least one of the male and female components. The compression seal includes a first damping component having a plurality of shaped surfaces; a second damping component that is at least partially enclosed in the first damping component; and a bump-stop component. In some embodiments, two of the plurality of shaped surfaces of the first damping component partially surround the second damping component such that, when the door slab compresses the compression seal, the compressed seal forms a pseudo-Helmholtz filter. In some embodiments, the door frame further includes a sill seal material disposed between the door frame and the first wall face, the second wall face, and the rough door opening.

In some embodiments, the door slab further includes a bottom seal mounted to an outer bottom surface of the outer skin such that the bottom seal is permitted to move relative to the outer skin. In some embodiments, the bottom seal includes a seal pan, a pressure member at least partially disposed in the seal pan, a sealing strip attached to a bottom surface of the seal pan, and a dampening material disposed in the seal pan. In some embodiments, the bottom seal is rotatable about a longitudinal axis thereof. In some embodiments, the bottom seal is rotatable about a lateral axis thereof.

In some embodiments, the door slab further includes a first hinge bracket disposed in a first hinge pocket of the outer skin. The first hinge bracket is adapted such that, when the door slab is installed in a door frame having a corresponding second hinge bracket disposed in a second hinge pocket of the door frame, a hinge connected to the first and second hinge brackets is concealed within the first and second hinge brackets when the door slab is in a closed position in the door frame.

According to a second embodiment of the present technology, a sound damping door kit including a door slab, a door frame, and a compression seal is provided. The door slab includes an outer skin, a constrainment sheet inside the outer skin, a damping fill material inside the outer skin, and an acoustic insert inside the outer skin. The constrainment sheet is arched from a center of the outer skin to first and second ends of the outer skin as measured along the width of the outer skin. The damping fill material forms a layer on an interior surface of the outer skin, and the constrainment sheet is at least partially embedded in the damping fill material.

In some embodiments, the door frame includes a male component adapted to engage with a first wall face of the wall, a female component adapted to engage with a second wall face of the wall, at least one angle bracket having a first panel for securing to the rough door opening and a second panel for securing to at least one of the male and female components, and at least one isolation gasket adapted to be disposed between the male and female components. The male and female components are adapted to engage each other in the rough door opening between the first and second wall faces.

In some embodiments, the compression seal includes a first damping component having a plurality of shaped surfaces, a second damping component at least partially enclosed in the first damping component, and a bump-stop component. In some embodiments, two of the plurality of shaped surfaces partially surround the second damping component such that, when the door slab compresses the compression seal, the compressed seal forms a pseudo-Helmholtz filter.

In some embodiments, the sound damping door kit further includes a bottom seal mounted to a bottom surface of the door slab such that the bottom seal is permitted to move relative to the door slab. In some embodiments, the bottom seal includes a seal pan, a pressure member at least partially disposed in the seal pan, a sealing strip attached to a bottom surface of the seal pan, and a dampening material in the seal pan. In some embodiments, the bottom seal is rotatable about a longitudinal axis thereof. In some embodiments, the bottom seal is rotatable about a lateral axis thereof. In some embodiments, the bottom seal is rotatable about both longitudinal and lateral axes thereof.

In some embodiments, the sound damping door kit further includes a hinge assembly. The hinge assembly includes a first hinge bracket adapted to be disposed in a first hinge pocket of the door slab, a second hinge bracket adapted to be disposed in a second hinge pocket of the door frame, and a hinge connected to the first and second hinge brackets and adapted to be concealed within the first and second hinge brackets when the hinge assembly is in a closed position.

According to a third embodiment of the present technology, a door slab including an outer skin, a constrainment sheet inside the outer skin, a damping fill material inside the outer skin, and an acoustic insert inside the outer skin is provided. The constrainment sheet spans substantially the entire width of the outer skin, spans substantially the entire height of the outer skin, and is arched from a center of the outer skin to first and second ends of the outer skin as measured along the width of the outer skin. The damping fill material forms a layer on an interior surface of the outer skin, and the constrainment sheet is at least partially embedded in the damping fill material.

In some embodiments, the door slab further includes a bottom seal mounted to a bottom surface of the outer skin such that the bottom seal is permitted to move relative to the outer skin.

According to a fourth embodiment of the present technology, a door frame having a male component, a female component, at least one angle bracket, and at least one isolation gasket is provided. The male component is adapted to engage with a first wall face. The female component is adapted to engage with a second wall face. The male and female components are adapted to engage each other in a rough door opening between the first and second wall faces. The at least one angle bracket has a first panel for securing to the rough door opening and a second panel for securing to at least one of the male and female components. The at least one isolation gasket is adapted to be disposed between the male and female components.

In some embodiments, the door frame further includes a compression seal mounted to at least one of the male and female components. In some embodiments, the compression seal includes a first damping component having a plurality of shaped surfaces, a second damping component that is at least partially enclosed in the first damping component, and a bump-stop component.

In some embodiments, the door frame further includes a first hinge bracket disposed in a first hinge pocket of the female component. The first hinge bracket is adapted such that, when a door having a corresponding second hinge bracket disposed in a second hinge pocket of the door is installed in the door frame, a hinge connected to the first and second hinge brackets is concealed within the first and second hinge brackets when the door is in a closed position in the door frame.

In some embodiments, the door frame further includes a sill seal material disposed between the door frame and the first wall face, the second wall face, and the rough door opening. In some embodiments, the sill seal material is formed of fiberglass.

According to a fifth embodiment of the present technology, a sound damping door kit including a door frame, a door slab adapted to be mounted to the door frame, and a compression seal adapted to be disposed between the door frame and the door slab is provided. The door frame includes a male component adapted to engage with a first wall face; a female component adapted to engage with a second wall face, wherein the male and female components are adapted to engage each other in a rough door opening between the first and second wall faces; at least one angle bracket having a first panel for securing to the rough door opening and a second panel for securing to at least one of the male and female components; and at least one isolation gasket adapted to be disposed between the male and female components. The compression seal is adapted to be mounted to at least one of the male and female components.

In some embodiments, the sound damping door kit further includes a bottom seal adapted to be mounted to a bottom surface of the door slab such that the bottom seal is permitted to move relative to the door slab.

In some embodiments, the sound damping door kit further includes a hinge assembly. The hinge assembly includes a first hinge bracket adapted to be disposed in a first hinge pocket of the door frame, a second hinge bracket adapted to be disposed in a second hinge pocket of the door slab, and a hinge connected to the first and second hinge brackets and adapted to be concealed within the first and second hinge brackets when the hinge assembly is in a closed position.

According to a sixth embodiment of the present technology, a door seal having first and second damping components is provided. The first damping component has a plurality of shaped surfaces, and the second damping component is at least partially enclosed in the first damping component.

In some embodiments, the first damping component only partially surrounds the second damping component such that, when a door compresses the seal, the first damping component does not completely surround the second damping component.

In some embodiments, two of the plurality of shaped surfaces of the first damping component partially surround the second damping component such that, when a door compresses the seal, the compressed seal forms a pseudo-Helmholtz filter. In some embodiments, the pseudo-Helmholtz filter dissipates noise in a frequency bandwidth of 500 Hz to 4,000 Hz. In some embodiments, the pseudo-Helmholtz filter dissipates noise in a frequency bandwidth of 800 Hz to 4,000 Hz.

In some embodiments, the door seal further includes a bump-stop component formed of one of the plurality of shaped surfaces.

In some embodiments, the door seal further includes an opening adapted to receive a protrusion of a door frame for mounting the seal to the door frame.

In some embodiments, the first damping component is formed of a silicone material having a durometer of Shore 25 A.

In some embodiments, the second damping component is formed of an open cell foam material.

According to a seventh embodiment of the present technology, a sound damping door kit including a door seal, a door frame adapted to receive the door seal, and a door slab adapted to mount to the door frame and compress the door seal is provided. The door seal includes a first damping component having a plurality of shaped surfaces; a second damping component at least partially enclosed in the first damping component such that, when the door slab compresses the door seal, the compressed door seal forms a pseudo-Helmholtz filter; and a bump-stop component. In some embodiments, the compressed door seal forms a pseudo-Helmholtz filter that dissipates noise in a frequency bandwidth of 500 Hz to 4,000 Hz. In some embodiments, the door seal further includes an opening adapted to receive a protrusion of the door frame for mounting the door seal to the door frame.

In some embodiments, the sound damping door kit further includes a bottom seal adapted to be mounted to a bottom surface of the door slab such that the bottom seal is permitted to move relative to the door slab.

In some embodiments, the sound damping door kit further includes a hinge assembly. The hinge assembly includes a first hinge bracket adapted to be disposed in a first hinge pocket of the door frame, a second hinge bracket adapted to be disposed in a second hinge pocket of the door slab, and a hinge connected to the first and second hinge brackets and adapted to be concealed within the first and second hinge brackets when the hinge assembly is in a closed position.

According to an eighth embodiment of the present technology, a door bottom seal having a seal pan, a pressure member at least partially disposed in the seal pan, a sealing strip attached to a bottom surface of the seal pan, and a dampening material disposed in the seal pan is provided.

In some embodiments, the door bottom seal further includes a low-friction fabric cover layer disposed on a bottom surface of the sealing strip.

In some embodiments, the dampening material is disposed between a bottom surface of the pressure member and a top surface of the seal pan. In some embodiments, the bottom surface of the pressure member has a convex shape.

In some embodiments, the door bottom seal further includes at least one mounting slot for mounting the seal to a door such that the seal is permitted to move relative to the door. In some embodiments, the seal is mounted to the door such that the seal is rotatable about a longitudinal axis of the seal. In some embodiments, the seal is mounted to the door such that the seal is rotatable about a lateral axis of the seal.

In some embodiments, the pressure member is formed of a closed cell foam material.

According to a ninth embodiment of the present technology, a sound damping door kit including a door bottom seal, a door slab adapted to receive the bottom seal, and a door frame adapted to mount the door slab in a rough door opening of a wall. The bottom seal includes a seal pan; a pressure member at least partially disposed in the seal pan; a sealing strip attached to a bottom surface of the seal pan; a dampening material disposed in the seal pan; a low-friction fabric cover layer disposed on a bottom surface of the sealing strip; and at least one mounting slot for mounting the bottom seal to the door slab such that the bottom seal is permitted to move relative to the door slab. In some embodiments, when the bottom seal is mounted to the door slab, the bottom seal is rotatable about a longitudinal axis of the bottom seal. In some embodiments, when the bottom seal is mounted to the door slab, the bottom seal is rotatable about a lateral axis of the bottom seal. In some embodiments, when the bottom seal is mounted to the door slab, the bottom seal is rotatable about both longitudinal and lateral axes of the bottom seal.

In some embodiments, the sound damping door kit further includes a compression seal adapted to be disposed between the door frame and the door slab.

In some embodiments, the sound damping door kit further includes a hinge assembly. The hinge assembly includes a first hinge bracket adapted to be disposed in a first hinge pocket of the door frame, a second hinge bracket adapted to be disposed in a second hinge pocket of the door slab, and a hinge connected to the first and second hinge brackets and adapted to be concealed within the first and second hinge brackets when the hinge assembly is in a closed position.

According to a tenth embodiment of the present technology, a sound damping door system having a door frame, a compression seal, a door slab, a bottom seal, and a hinge is provided. The door frame includes a male component adapted to engage with a first wall face of a wall; a female component adapted to engage with a second wall face of the wall, wherein the male and female components are adapted to engage each other in a rough door opening between the first and second wall faces; at least one angle bracket having a first panel for securing to the rough door opening and a second panel for securing to at least one of the male and female components; at least one isolation gasket adapted to be disposed between the male and female components; and a first hinge bracket disposed in a first hinge pocket of the female component. The compression seal is mounted to the door frame. The door slab includes an outer skin; a curved constrainment sheet inside the outer skin; a damping fill material inside the outer skin; an acoustic insert inside the outer skin; and a second hinge bracket disposed in a second hinge pocket of the outer skin. The bottom seal is mounted to a bottom surface of the door slab such that the bottom seal is permitted to move relative to the door slab. The hinge is connected to the first and second hinge brackets for securing the door slab to the door frame. The hinge is adapted to be concealed within the first and second hinge brackets when the door slab is in a closed position in the door frame.

In some embodiments, the door frame further includes a sill seal material disposed between the door frame and the first wall face, the second wall face, and the rough door opening.

In some embodiments, the constrainment sheet of the door slab is arched from a center of the outer skin to first and second ends of the outer skin as measured along the width of the outer skin.

In some embodiments, the damping fill material forms a layer on an interior surface of the outer skin, and wherein the constrainment sheet is at least partially embedded in the damping fill material.

In some embodiments, the compression seal includes a first damping component, a second damping component, and a bump-stop component. The first damping component has a plurality of shaped surfaces. The second damping component is partially enclosed in the first damping component such that, when the seal is compressed, the first damping component does not completely enclose the second damping component such that the compressed seal forms a pseudo-Helmholtz filter.

In some embodiments, the bottom seal includes a seal pan; a pressure member at least partially disposed in the seal pan, wherein the pressure member has a convex shaped bottom surface; a sealing strip attached to a bottom surface of the seal pan; a dampening material disposed in the seal pan; and a low-friction fabric cover layer disposed on a bottom surface of the sealing strip.

In some embodiments, the sound damping door system further includes a threshold secured to a floor within the rough door opening.

According to an eleventh embodiment of the present technology, a sound damping door kit having a door slab, a door frame, a compression seal, a door bottom seal, and a hinge assembly is provided. The door slab includes an outer skin; a constrainment sheet inside the outer skin, wherein the constrainment sheet is arched from a center of the outer skin to first and second ends of the outer skin as measured along the width of the outer skin; a damping fill material inside the outer skin; and an acoustic insert inside the outer skin. The door frame includes a male component adapted to engage with a first wall face; a female component adapted to engage with a second wall face, wherein the male and female components are adapted to engage each other in a rough door opening between the first and second wall faces; at least one angle bracket having a first panel for securing to the rough door opening and a second panel for securing to at least one of the male and female components; and at least one isolation gasket adapted to be disposed between the male and female components. The compression seal includes a first damping component having a plurality of shaped surfaces; a second damping component partially enclosed in the first damping component such that, when the seal is compressed, the first damping component does not completely enclose the second damping component such that the compressed seal forms a pseudo-Helmholtz filter; a bump-stop component; and an opening adapted to receive a protrusion of the female component of the door frame for mounting the compression seal to the door frame. The door bottom seal includes a seal pan; a pressure member at least partially disposed in the seal pan, wherein the pressure member has a convex shaped bottom surface; a sealing strip attached to a bottom surface of the seal pan; a dampening material disposed in the seal pan; a low-friction fabric cover layer disposed on a bottom surface of the sealing strip; and at least one mounting slot for mounting the door bottom seal to the door slab such that the door bottom seal is permitted to move relative to the door slab. The hinge assembly includes a first hinge bracket adapted to be disposed in a first hinge pocket of the door frame; a second hinge bracket adapted to be disposed in a second hinge pocket of the door slab; and a hinge connected to the first and second hinge brackets and adapted to be concealed within the first and second hinge brackets when the hinge assembly is in a closed position.

In some embodiments, the kit further includes a threshold adapted to be secured to a floor within the rough door opening.

Further objects, aspects, features, and embodiments of the present technology will be apparent from the drawing figures and below description.

BRIEF DESCRIPTION OF THE DRAWINGS

FIG. 7A shows a cross-section view of a door frame mounted in a rough door opening according to an embodiment of the present technology.

FIG. 7B shows a detail view of an isolation gasket between the male and female frame halves of the door frame of FIG. 7A.

FIG. 7C shows an isometric view of the angle bracket used to secure the door frame of FIG. 7A to the rough wall opening.

DETAILED DESCRIPTION

Figure 1A:
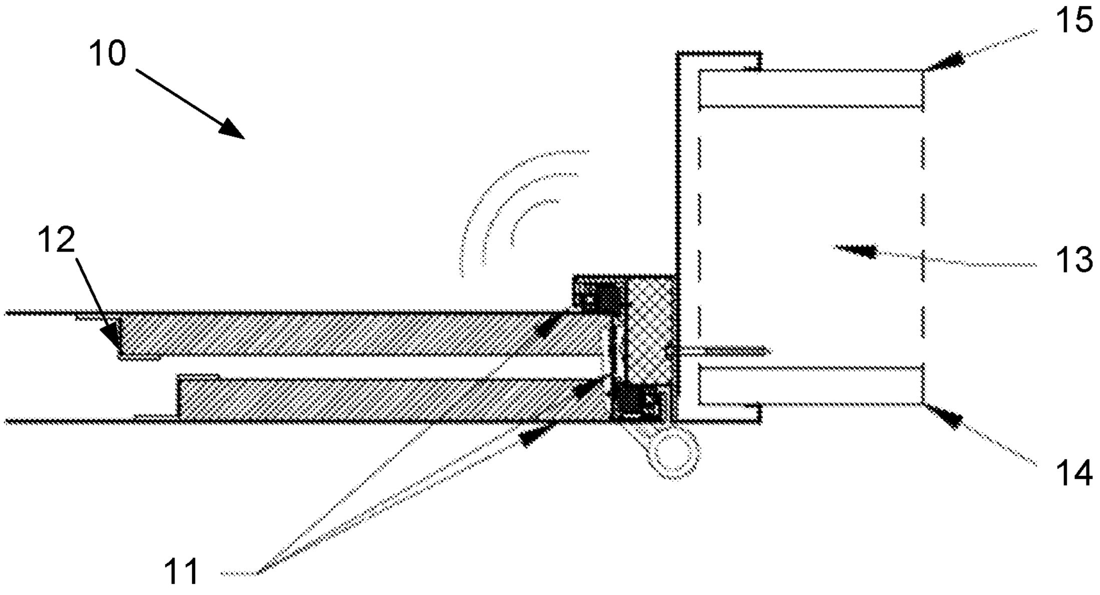
FIGS. 1A-ID show various elevation and cross-section views of a prior art sound damping door design.
Figure 1B:
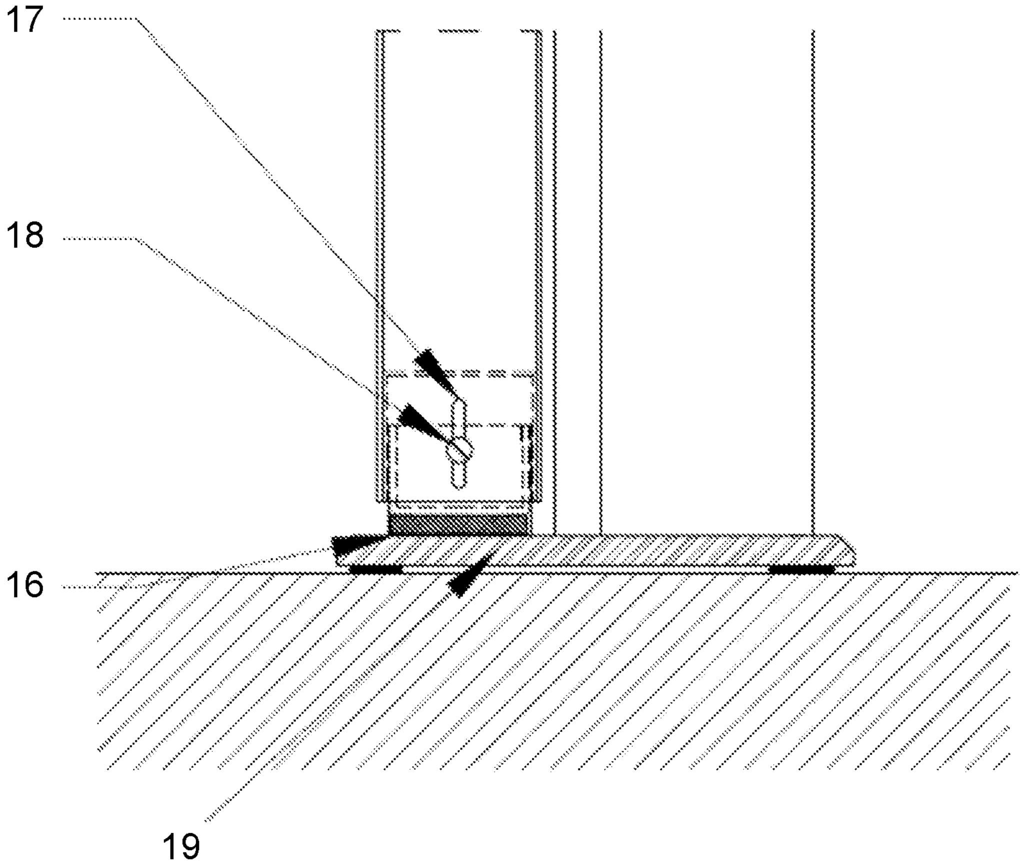
Figure 1C:
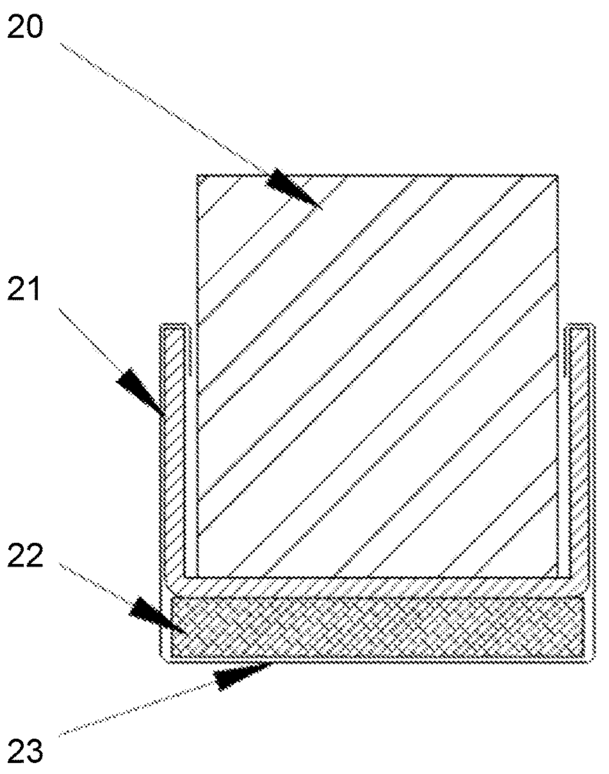
Figure 1D:
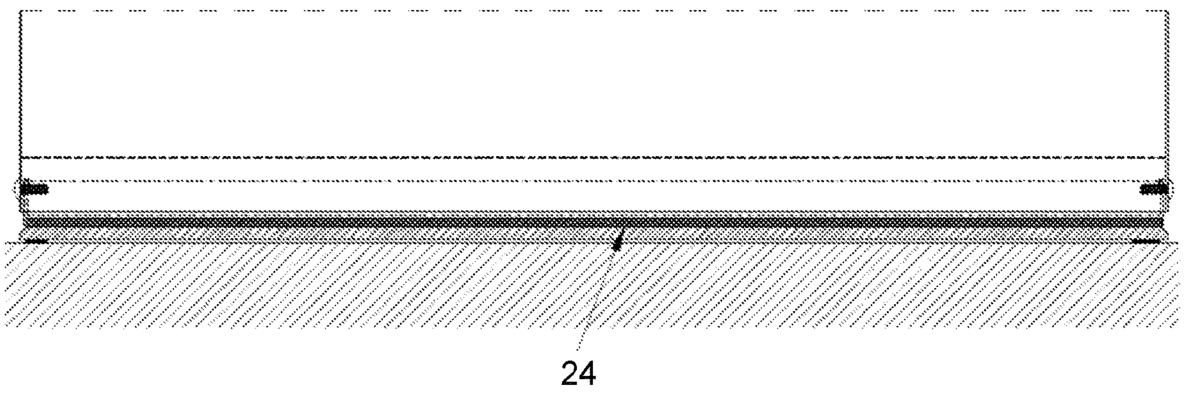
Figure 2:
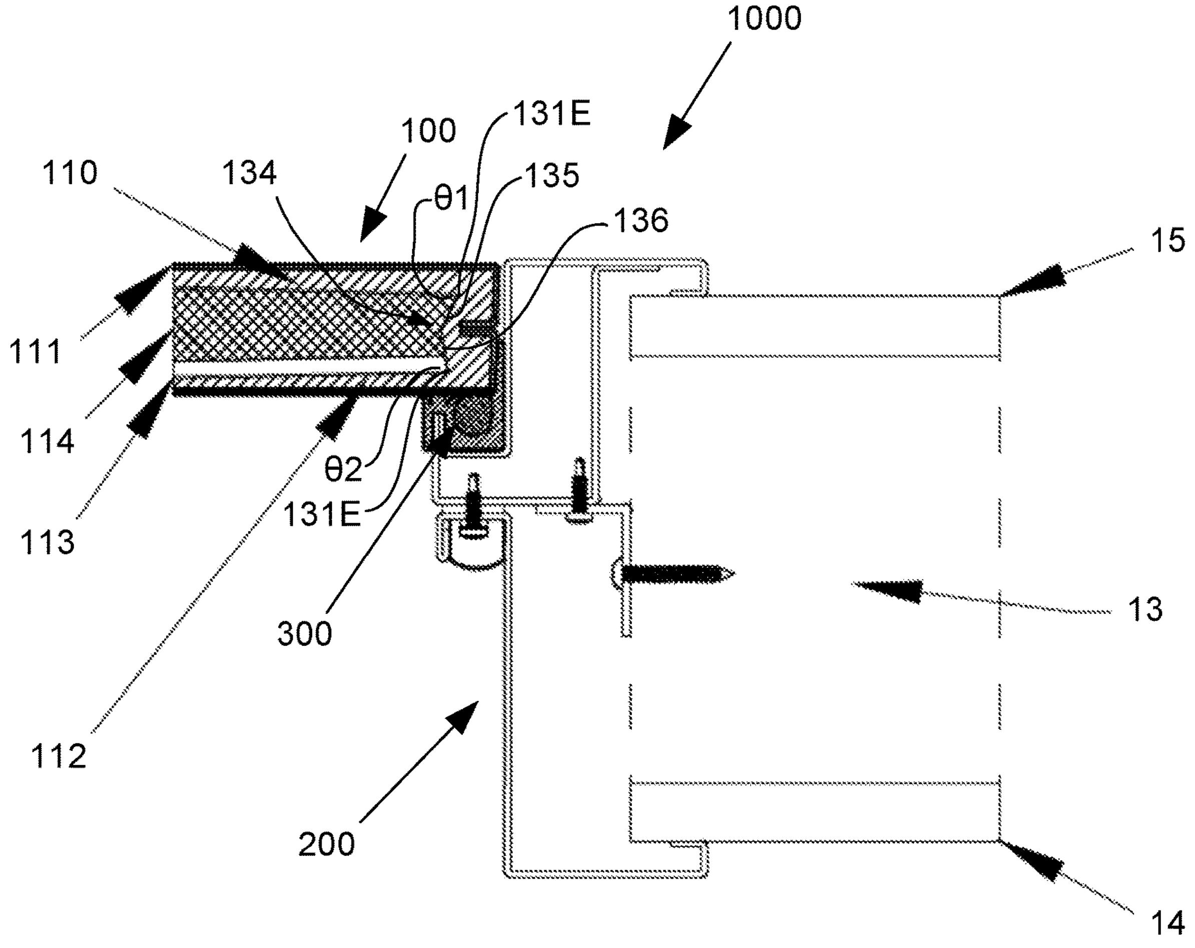
FIG. 2 shows a cross-section view of a portion of a sound damping door according to an embodiment of the present technology, and a wall section to which the door is mounted.
Figure 3:
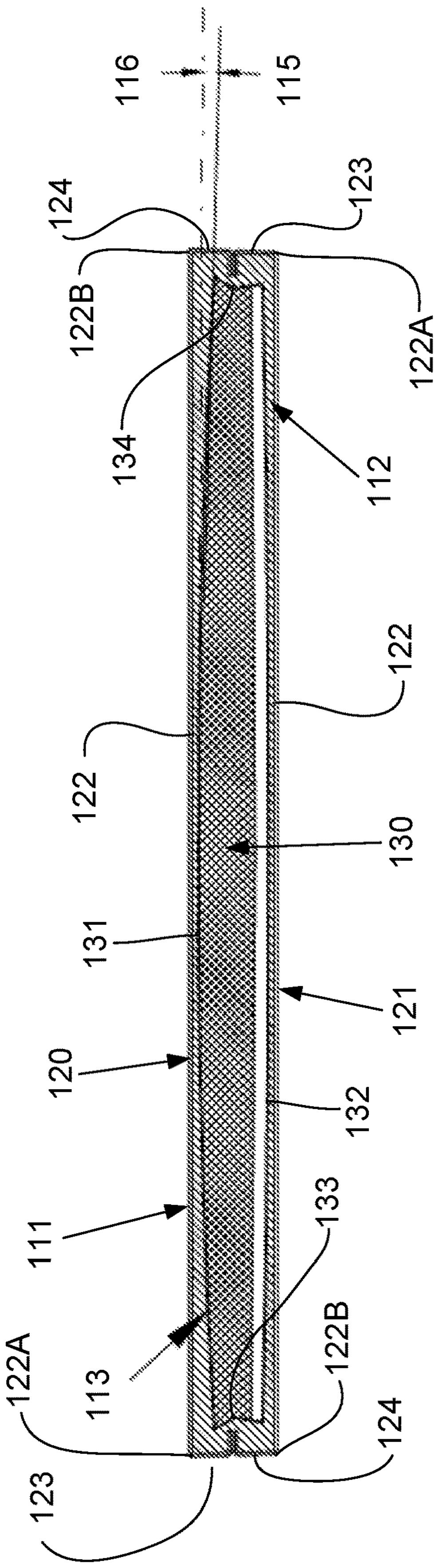
FIG. 3 shows a cross-section view of the door slab of the door shown in FIG. 2.

Embodiments of the present technology will now be described, by way of example only, with references to the accompanying drawing figures. FIG. 2 shows a cross-section view of a sound damping door 100 and door frame 200 used in a sound damping door system 1000 according to a first embodiment of the present technology mounted in a rough door opening 13 in a wall having first and second wall faces 14/15. The door 100 includes a door slab 110. The door slab 110 includes an outer skin 111, which, in some embodiments, is 16-gauge sheet metal, such as steel. In some embodiments, other materials are used for the outer skin 111, such as wood, polymer materials, and composites. As shown in FIG. 3, the outer skin 111 includes a front panel 120 and a back panel 121. Each of the front panel 120 and the back panel 121 includes a face portion 122, a first end portion 123 at a first edge 122A of the face portion 122, and a second end portion 124 at a second edge 122B of the face portion 122. The front panel 120 is secured to the back panel 121 by securing the first end portion 123 of the front panel 120 to the second end portion 124 of the back panel 121, and by securing the second end portion 124 of the front panel 120 to the first end portion 123 of the back panel 121. The front panel 120 and the back panel 121 are secured together by any means known in the art, such as crimping, welding, fastening, etc. In some embodiments, the slab 110 includes a damping fill 112, a constrainment sheet 113, and an acoustic damper 114.

In some embodiments, the slab 110 includes a damping fill 112, which helps provide acoustic flanking path termination due to orthogonal facing surfaces. The perimeter of the door edge utilizes internal shapes and the damping fill 112 to terminate the phenomena before it can bypass the seal. In some embodiments, a single seal attains sound transmission loss values equivalent to, or better than, a double seal system found in many prior art designs. As shown in FIG. 3, the damping fill 112 forms a layer on the interior surfaces of the outer skin 111. The damping fill 112 is shaped such that it defines a cavity 130. The cavity 130 includes a first curved side 131 and a second curved side 132 opposing the first curved side 131. Each of the first curved side 131 and the second curved side 132 extends from a first end 133 of the cavity 130 to a second end 134 of the cavity 130. As best shown in FIG. 2, each of the first end 133 and the second end 134 of the cavity 130 includes a first segment 135 that extends inwardly from an end point 131E of the first curved side 131 at a first acute angle θ1 (i.e., less than ninety degrees), and a second segment 136 that extends inwardly from an end point 132E of the second curved side 132 at a second acute angle θ2 (i.e., less than ninety degrees) and converges with the first segment 135. The second acute angle θ2 is different from the first acute angle θ1.

In some embodiments, the damping fill 112 is formed of a low durometer blend of silicone polymer and powdered recycled rubber. In preferred embodiments, the combined durometer of the damping fill is Shore 29 A. In some embodiments, the combined durometer of the damping fill 112 is in the range of Shore 27 to 35 A. In other embodiments, the combined durometer of the damping fill 112 is in the range of Shore 28 A to 32 A.

In some embodiments, the slab 110 includes a constrainment sheet 113. In some embodiments, the constrainment sheet 113 is formed of 22-gauge sheet metal, though other thicknesses and materials are used in other embodiments. Preferably, the constrainment sheet 113 is curved. In some embodiments, the constrainment sheet 113 spans approximately the entire width of the door slab 110. In some embodiments, the constrainment sheet 113 spans approximately the entire height of the door slab 110. In some embodiments, the constrainment sheet 113 spans approximately the entire thickness of the door slab 110. In some embodiments, the constrainment sheet 113 is arched across the width of the door slab, as shown in FIG. 3, i.e., the constrainment sheet 113 is arched from the center of the outer skin 111 to its edges. This arched configuration provides greater deformation strength over the face of the door slab 110 as compared to the prior art Z- or C-channel stiffeners (or other bent-type stiffeners), which are welded to a door slab face at modal intervals across the slab. In some embodiments, the constrainment sheet 113 is arched so that a tangent line 115 at the edge of the sheet makes approximately a 1°-2° angle with respect to a plane 116 of the outer skin 111 of the door slab 110. However, different angles are used in other embodiments. In some embodiments, the dimensions of the door determine the angle chosen. In some embodiments, at least two opposing constrainment sheets 113 joined at peripheral edges thereof form a constrainment skin within the door slab 110. In some embodiments, the constrainment skin is formed of at least two opposing arched constrainment sheets 113.

In some embodiments, the arched constrainment sheet 113 improves stiffness so that the door slab 110 can be made thinner. For example, in some embodiments, the door slab 110 is about 1.75 inches thick, which is thinner than typical prior art sound damping doors that have a thickness of 2.5 inches. Decreasing the thickness of the door decreases the air-gap, volume of absorptive material, resonance frequencies, and bending moment forces of the door system. Vertical strength of the door face sheet is often reduced in thinner doors because the attachment angles are all shorter in height (by approximately 30%), which reduces their stiffness by a factor of 1.8.

In some embodiments, damping fill 112 is injected between the outer skin 111 and the constrainment sheet 113 such that damping fill 112 provides a shear medium that both dampens and provides elasticity. The design in such embodiments allows the face of the door slab 110 to rebound to its original position if struck with projectiles. Preferably, as long as the projectile force is less than the system deformation rate of the combined outer skin 111, damping fill 112, and constrainment sheet 113, then the door slab face will rebound to its original position and be able to withstand multiple projectile impacts without structural damage or failure.

In some embodiments, the design of the constrainment sheet 113 and damping fill 112 helps address material resonance issues due to the modified passive viscoelastic constrained layer damping technique. In some embodiments, the constrainment sheet 113 provides a non-symmetrical structure for minimal coincidence transmission, and becomes the underlying replacement for bent angle type stiffeners in the door structure. Elimination of the orthogonal face cavity by utilizing a damping fill 112 and constrainment sheet 113 allows the door slab 110 to be made with less mass, smaller thickness (i.e., smaller distance between door faces), and to perform at equal or higher transmission loss levels than prior art designs. In the embodiment shown in FIG. 3, the shape of the area created between the outer skin 111 and the inner constrainment skin 113 is directly related to the ability of the design to shunt (or terminate) frequencies ranging from 400 Hz to 2,000 Hz. In this embodiment, the outer skin 111, damping fill 112, and constrainment sheet 113 form a resonance filter/dampener that helps reduce spurious orthogonal acoustic flanking through door cavity by bypassing seals.

Some embodiments of the present technology provide similar transmission loss characteristics to older systems that weigh approximately 20% more and are significantly thicker, i.e., 10.1 lbs/ft$^2$ vs. 12.1 lbs/ft$^2$, and 1.75 inches vs. 2.5 inches thick.

In some embodiments, the door slab 110 includes an acoustic damping panel 114. In some embodiments, a 6 pcf panel is used. As used herein, the term "pcf" is a measure of density meaning "pounds per cubic foot." In some embodiments, the acoustic damping panel 114 is formed of such materials as fiberglass, polymers, natural fibers, and composites.

FIGS. 4A-4D show different views of a door bottom seal 400 according to an embodiment of the present technology. In the embodiment shown, the door bottom seal 400 is an articulated sealing mechanism for use at the bottom of a level swing door, such as door slab 110 of sound damping door 100. However, features of this embodiment are used with other types of doors in other embodiments. In some embodiments, the door bottom seal 400 is an articulated door bottom seal with equal distribution pressure 401 over the entire sealing surface 19, which is a threshold in this embodiment, but is a floor or other surface in other embodiments. In some embodiments, the door bottom seal 400 includes a seal pan 402, which is mounted to the door slab 110 by a set screw 403. In some embodiments, the seal pan 402 is formed of metal, such as 16-gauge steel. Other embodiments use other metals of varying gauges, or other materials of appropriate thickness and durability. The seal pan 402 includes a slot 404 for receiving the set screw 403, which permits vertical adjustment of the door bottom seal 400. In some embodiments, a sealing strip 405 of polymer material is included on the bottom surface of the seal pan 402. In some embodiments, strip 405 is a visco-elastic polymer material having a durometer of Shore 00. Other embodiments use other materials of appropriate durometer. In some embodiments, a low-friction cover 406 is included on the bottom surface of sealing strip 405. In some embodiments, cover 406 is a Teflon fabric.

In some embodiments, a pressure member such as a foam insert 407 is disposed within the seal pan 402 of the door bottom seal 400. In some embodiments, the foam insert 407 is a 2 psi polyurethane closed cell foam. In some embodiments, the foam insert 407 is contoured such that its bottom surface 408 has a shape that does not correspond to the shape of the seal pan 402, forming one or more gaps between the foam insert 407 and the seal pan 402. In some embodiments, the bottom surface 408 of foam insert 407 has a convex shape. In some embodiments, the gaps between the foam insert 407 and the seal pan 402 are filled with a dampening material 409. In some embodiments, the dampening material 409 is the same material as the damping fill 112 inside the door slab 110, as described above. In other embodiments, different materials with different characteristics are used for the dampening material 409 in the door bottom seal 400, such as a silicone polymer material.

Preferably, the distributed 2 psi force provided by the foam insert 407 combined with the sealing strip 405 wrapped in the cover 406 allows the door bottom seal 400 to conform to small non-linear surface variations found in a raised threshold 19. In the embodiment shown, friction forces from the door bottom seal and level swing hinges are substantially less than prior art cam lift bottom seal designs and allow the door to be opened with less than 1.5 lbf. The door bottom seal 400, in this embodiment, provides an acoustic transmission loss characteristic in a 1.75 inches thick seal that is equal to the prior art 2.5 inches thick seals. In some embodiments, the door bottom seal 400 provides an acoustic transmission loss characteristic that is better than the prior art designs, despite bottom seal 400 being significantly thinner than the prior art designs.

In some embodiments, the door bottom seal 400 articulates and rotates about the longitudinal axis 410 of the door bottom seal 400 (i.e., the axis running along the bottom edge of the door slab 110 as measured along the width of the door 100) to automatically adjust to small elevation differences as the door bottom seal 400 interfaces with the threshold, floor, or other surface 19 below the door 100. Preferably, the low compression force and superior sealing ability allow the door 100 to at least equal the transmission loss characteristics of the typical prior art type seal and pass the ADA pull test.

Figure 4A:
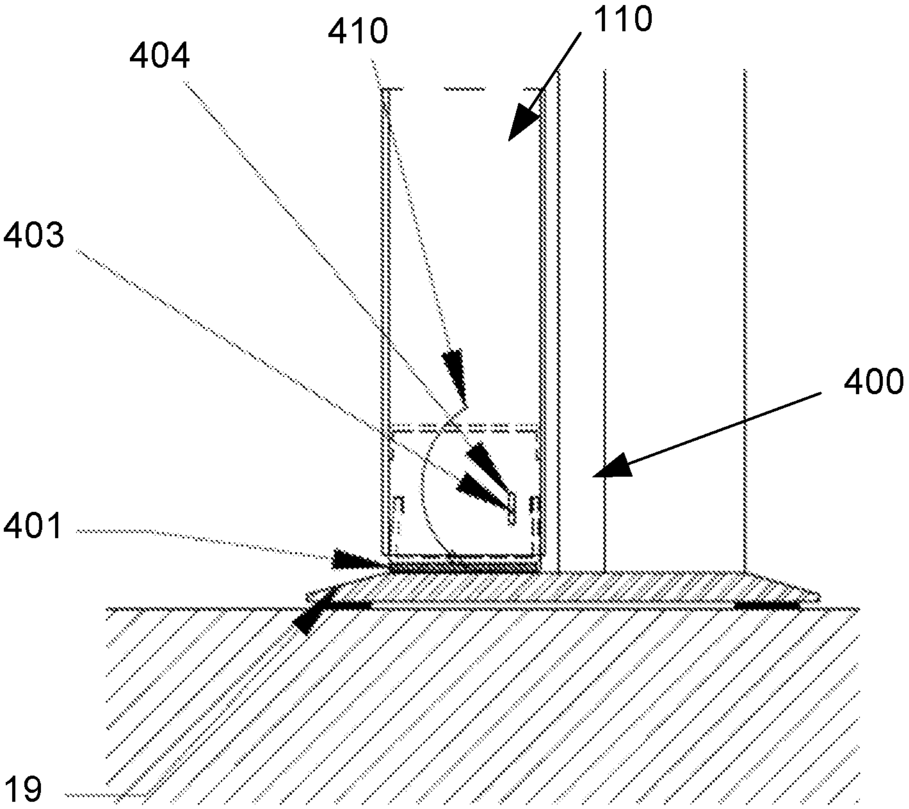
FIG. 4A shows a side elevation view of a bottom seal according to an embodiment of the present technology.
Figure 4B:
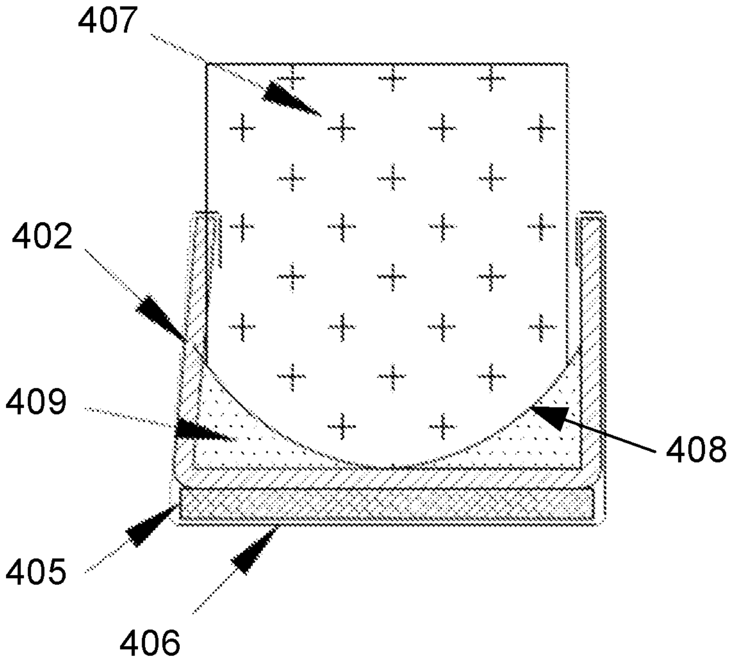
FIG. 4B shows a cross-section view of the bottom seal shown in FIG. 4A.
Figure 4C:
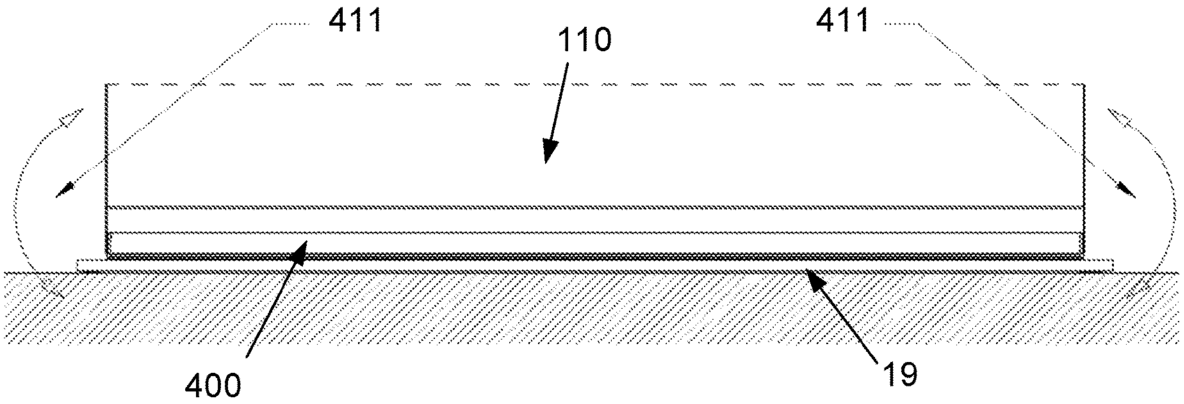
FIG. 4C shows a front elevation view of the bottom seal shown in FIG. 4A.

In some embodiments, the door bottom seal 400 articulates and rotates about the lateral axis 411 of the bottom seal 400 (i.e., an axis that is perpendicular to the plane of the door slab 110), as shown in FIG. 4C. This allows the door bottom seal 400 to automatically adjust to small elevation variations along the width of the door (e.g., changes in the size of the gap between the bottom of the door 100 and the threshold or floor 19). Preferably, this provides improved distribution of the sealing force across the entire seal face.

In preferred embodiments, the door bottom seal 400 articulates and rotates about both the longitudinal axis 410 and the lateral axis 411 to provide an improved seal between the door 100 and surface 19 that accounts for variations in the surface 19 across multiple dimensions.

Figure 4D:
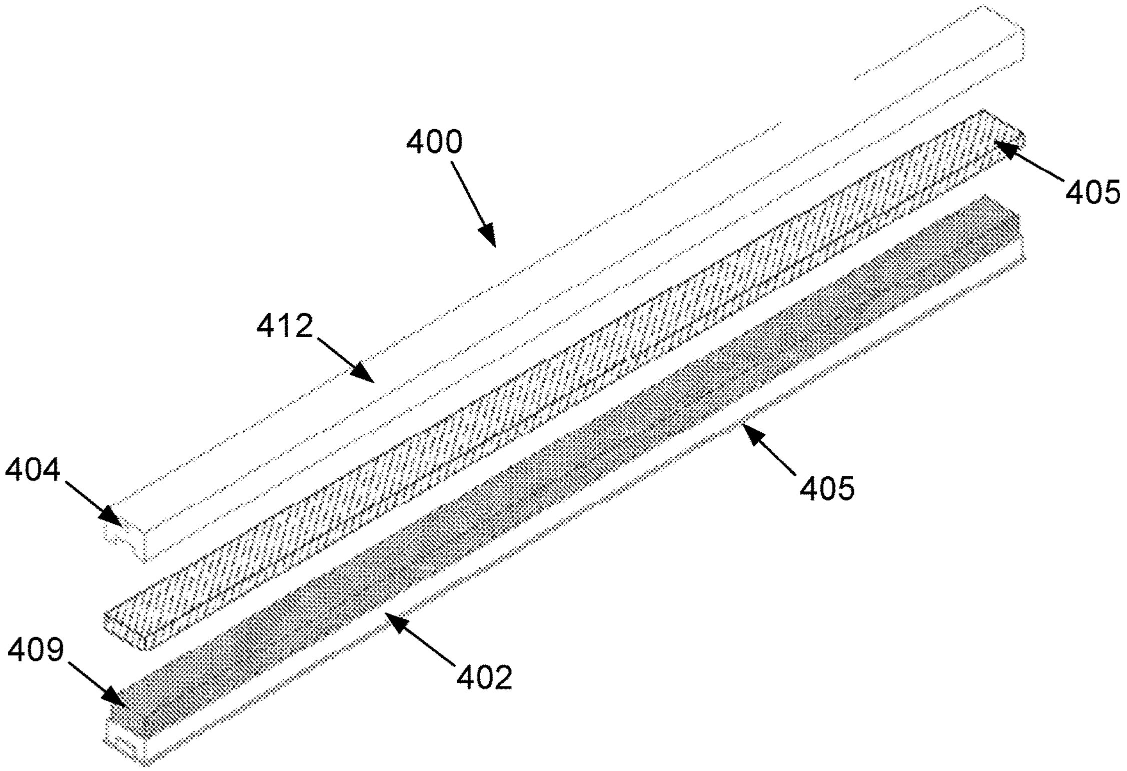
FIG. 4D shows an exploded view of the bottom seal shown in FIG. 4A.

In some embodiments, the door bottom seal 400 includes a top cap 412 that connects to the seal pan 402 to enclose the foam insert 407 and dampening material 409 within the bottom seal 400, as shown in FIG. 4D. In some embodiments, the top cap 412 includes the slot 404 for mounting the door bottom seal 400 to the door slab 110.

Figure 5A:
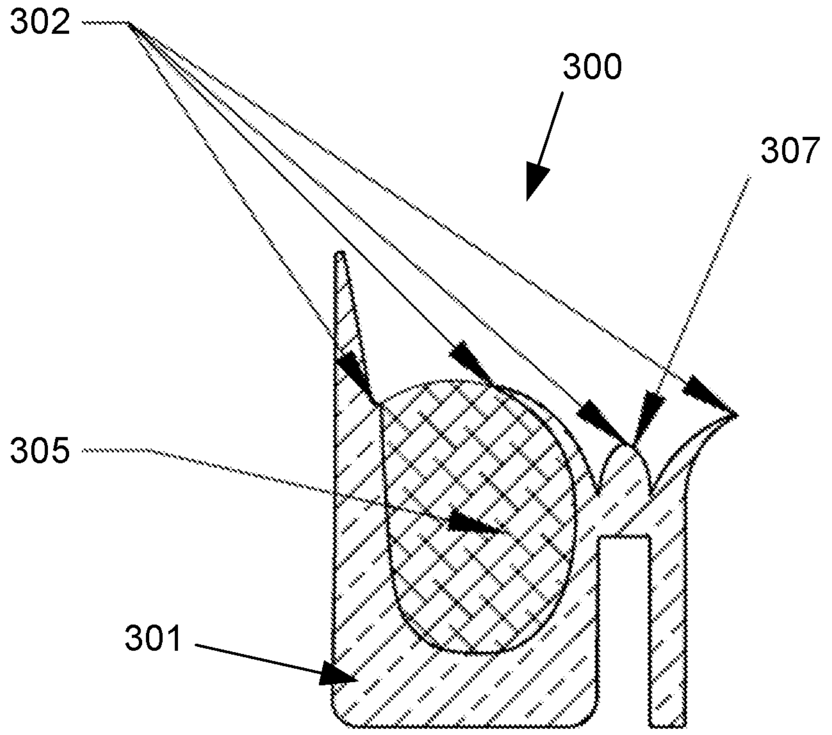
FIG. 5A shows a cross-section view of a door compression seal in an uncompressed state according to an embodiment of the present technology.
Figure 5B:
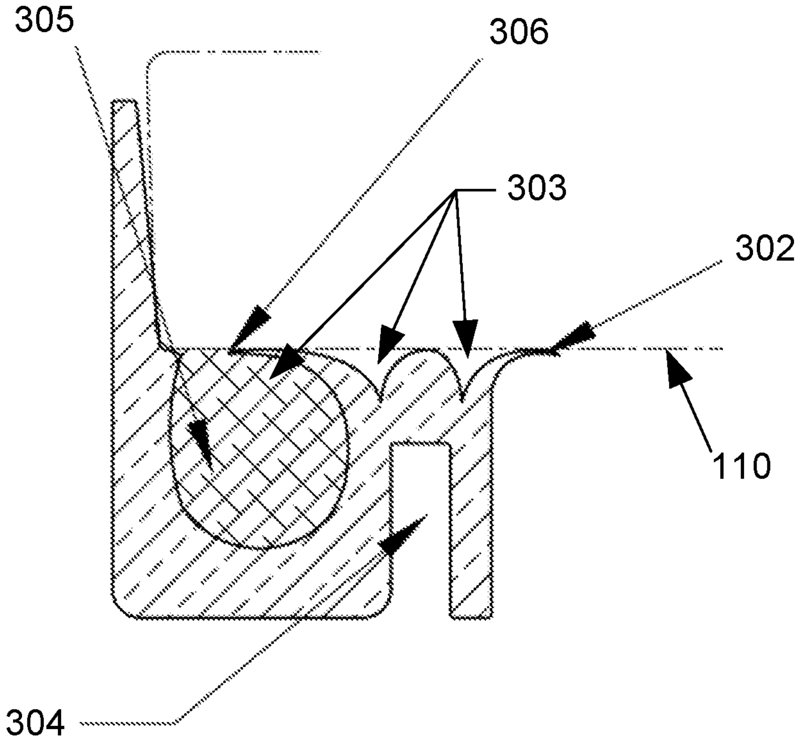
FIG. 5B shows a cross-section view of the door compression seal of FIG. 5A in a compressed state.

Some embodiments of the present technology are directed to a compression seal 300 that the door slab 110 is pressed against when the door 100 is closed within the door frame 200, as shown in FIG. 2. However, features of the embodiments of the compression seal 300 are used with other types of doors and door systems in other embodiments. The compression seal 300 is also shown in detailed cross-section views in FIGS. 5A and 5B. FIG. 5A shows the compression seal 300 in uncompressed position, and FIG. 5B shows the compression seal 300 in a compressed position (i.e., the shape of the compression seal 300 when the door slab 110 is closed against the compression seal 300). In some embodiments, the compression seal 300 has a body or first damping component 301 that provides an acoustical barrier with four separate sealing surfaces 302 that deform to form separate cavities 303 that provide an improved seal between the door slab 110 and the edges of the sealing surfaces 302. In some embodiments, each sealing surface 302 provides an acoustic barrier and dissipation cavity 303 to affect a determined frequency bandwidth between 800 Hz and 4,000 Hz. In some embodiments, the cavities 303 are non-symmetrical and vary in volume to provide an ever-increasing dissipation series of noise reduction paths as noise passes through the interface of the compression seal 300 and door slab 110.

In some embodiments, the compression seal 300 includes a seal mounting slot 304 that is configured to encapsulate a mounting edge or protrusion 210 of the door frame 200. The compression seal mounting slot 304 preferably provides vibration dampening to the entire perimeter of the seal mounting surface in the door frame 200. In some embodiments, the compression seal 300 is retained in the door frame 200 via constant pressure provided by a cylindrical strip or second damping component 305. In some embodiments, the strip 305 is partially enclosed in a cavity 303 of the body 301 by at least two of the sealing surfaces 302. The strip 305 preferably provides high frequency absorption in its respective cavity 303. In some embodiments, when the compression seal 300 is in its compressed position, the strip 305 remains partially enclosed (i.e., not completely surrounded) by the sealing surfaces 302 such that a gap 306 remains between the sealing surfaces 302, as shown in FIG. 5B. Preferably, the gap 306 permits the compressed seal 300 to form a pseudo-Helmholtz filter, with the size of the gap 306 determining the band-pass filter frequency response. In some embodiments, the compressed seal 300 forms a pseudo-Helmholtz filter that dissipates noise in a frequency bandwidth between 500 Hz and 4,000 Hz. In some embodiments, the compressed seal 300 formed a pseudo-Helmholtz filter that dissipates noise in a frequency bandwidth between 800 Hz and 4,000 Hz. In some embodiments, the body 301 is formed of a silicone blend material having a durometer of Shore 25 A. In some embodiments, the strip 305 is formed of a 2 pcf open cell foam rubber material. Other embodiments use different materials for the body 301 and strip 305 that provide appropriate damping and compression.

Figure 5C:
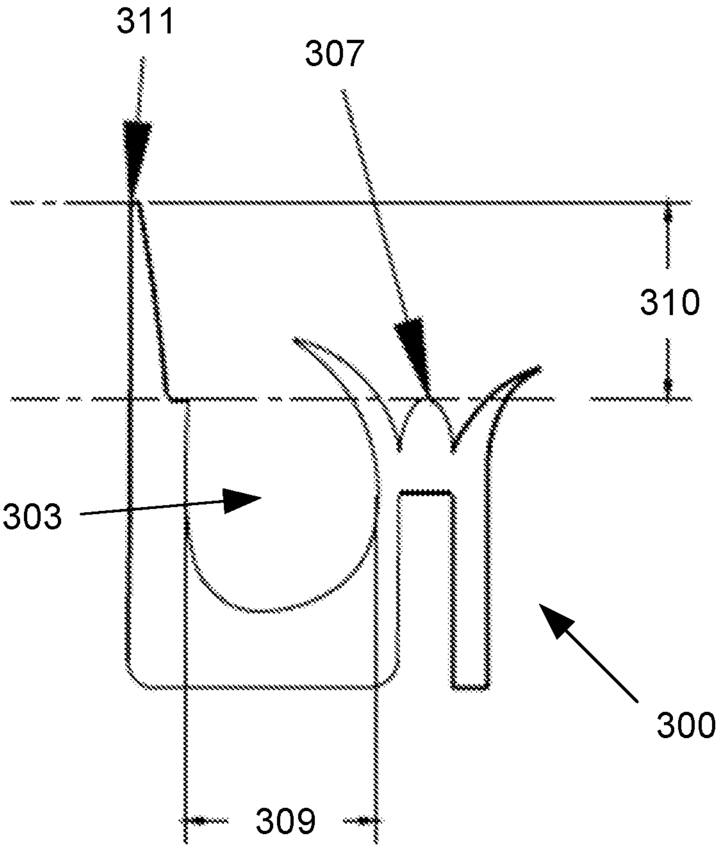
FIG. 5C shows a side view of the door compression seal of FIG. 5A according to an embodiment of the present technology.

In some embodiments, the compression seal 300 includes a deceleration bump-stop 307 to absorb the force associated with the door 100 being closed at a high velocity. The force is absorbed and then distributed equally across the perimeter interface of the door 100 and frame 200. The bump-stop 307 is surrounded on two opposing sides by two elongated sealing surfaces 302. The two elongated sealing surfaces 302 are curved in approximately opposing directions such that when compressed by the door 100, the two elongated sealing surfaces 302 are pressed away from the bump-stop 307 such that the door 100 is pressed against the bump-stop 307. In some embodiments, the bump-stop 307 is formed of one of the sealing surfaces 302, as shown in FIG. 5A. In other embodiments, the bump-stop 307 is a separate component attached to the body 301 and, in some embodiments, is formed of a different material than the body 301. In some embodiments, a mating surface distance 310 between the bump-stop 307 and a top surface 311 of the body 301 is equal to the diameter 309 of the absorption cavity 303 (i.e., the cavity 303 that holds the cylindrical strip 305), as shown in FIG. 5C. Other embodiments use different dimensions for the compression seal 300.

Figure 12:
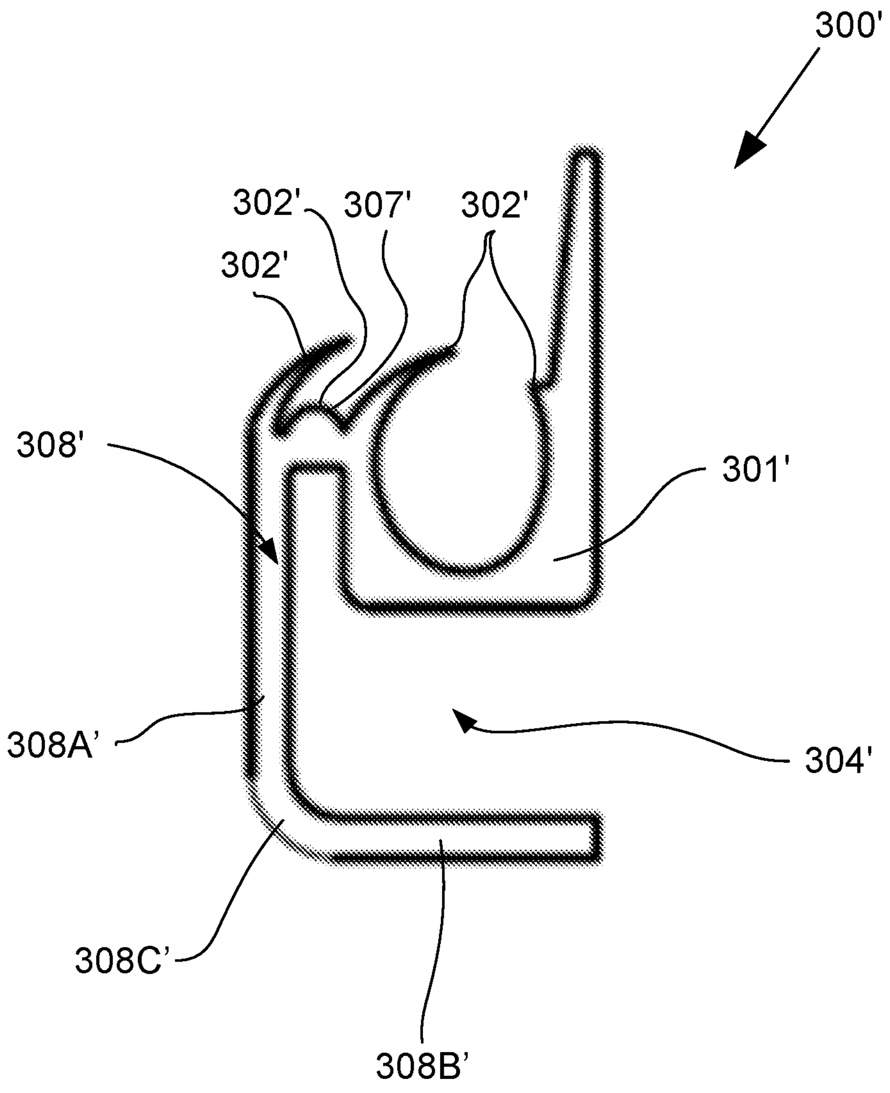
FIG. 12 shows a side view of a door compression seal in an uncompressed state according to an embodiment of the present technology.

FIG. 12 shows a compression seal 300' according to another example embodiment of the present technology. Like compression seal 300, compression seal 300' is configured to be pressed against by the door slab 110 when the door 100 is closed within the door frame 200, as shown in FIG. 2. However, features of the embodiments of the compression seal 300' are used with other types of doors and door systems in other embodiments. In some embodiments, the compression seal 300' has a body or first damping component 301' that provides an acoustical barrier with four separate sealing surfaces 302' that deform to form separate cavities 303 that provide an improved seal between the door slab 110 and the edges of the sealing surfaces 302', as discussed above regarding FIGS. 5A-5B. In some embodiments, each sealing surface 302' provides an acoustic barrier and dissipation cavity 303 to affect a determined frequency bandwidth between 800 Hz and 4,000 Hz. In some embodiments, the cavities 303 are non-symmetrical and vary in volume to provide an ever-increasing dissipation series of noise reduction paths as noise passes through the interface of the compression seal 300' and door slab 110.

In some embodiments, the compression seal 300' includes a seal mounting slot 304' that is configured to encapsulate a mounting edge or protrusion 210 of the door frame 200. As shown in FIG. 12, mounting slot 304' is defined by a body extension 308'. The body extension 308' has a first component 308A' and a second component 308B' that are substantially perpendicular to one another such that the mounting slot 304' has corresponding substantially perpendicular components. In some embodiments, a rounded corner component 308C' connects the first component 308A' and the second component 308B' to assist with installation of the compression seal 300' to the door frame 200. The mounting slot 304' permits the compression seal 300' to be mounted to male or female components of the door frame 200. The compression seal mounting slot 304' preferably provides vibration dampening to the entire perimeter of the seal mounting surface in the door frame 200. In some embodiments, the compression seal 300' is retained in the door frame 200 via constant pressure provided by the cylindrical strip or second damping component 305, as discussed above regarding FIGS. 5A-5B. In some embodiments, the strip 305 is partially enclosed in a cavity 303 of the body 301' by at least two of the sealing surfaces 302'. The strip 305 preferably provides high frequency absorption in its respective cavity 303. In some embodiments, when the compression seal 300' is in its compressed position, the strip 305 remains partially enclosed (i.e., not completely surrounded) by the sealing surfaces 302' such that a gap 306 remains between the sealing surfaces 302', as discussed above regarding FIG. 5B. Preferably, the gap 306 permits the compressed seal 300' to form a pseudo-Helmholtz filter, with the size of the gap 306 determining the band-pass filter frequency response. In some embodiments, the compressed seal 300' forms a pseudo-Helmholtz filter that dissipates noise in a frequency bandwidth between 500 Hz and 4,000 Hz. In some embodiments, the compressed seal 300' formed a pseudo-Helmholtz filter that dissipates noise in a frequency bandwidth between 800 Hz and 4,000 Hz. In some embodiments, the body 301' is formed of a silicone blend material having a durometer range of Shore 24-27, and preferably a durometer of Shore 25 A. In some embodiments, the strip 305 is formed of a 2 pcf open cell foam rubber material. Other embodiments use different materials for the body 301' and strip 305 that provide appropriate damping and compression.

In some embodiments, the compression seal 300' includes a deceleration bump-stop 307' to absorb the force associated with the door 100 being closed at a high velocity. The force is absorbed and then distributed equally across the perimeter interface of the door 100 and frame 200. As shown in FIG. 12, the bump-stop 307' is surrounded on two opposing sides by two elongated sealing surfaces 302'. The two elongated sealing surfaces 302' are curved in approximately the same direction such that when compressed by the door 100, at least one of the two elongated sealing surfaces 302' is pressed against the bump-stop 307'. In some embodiments, the bump-stop 307' is formed of one of the sealing surfaces 302'. In other embodiments, the bump-stop 307' is a separate component attached to the body 301' and, in some embodiments, is formed of a different material than the body 301'.

Figure 6A:
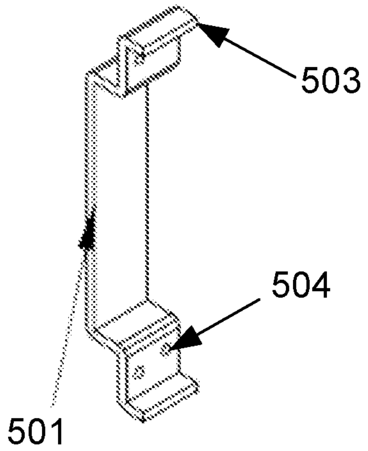
FIG. 6A shows a door hinge bracket according to an embodiment of the present technology.
Figure 6B:
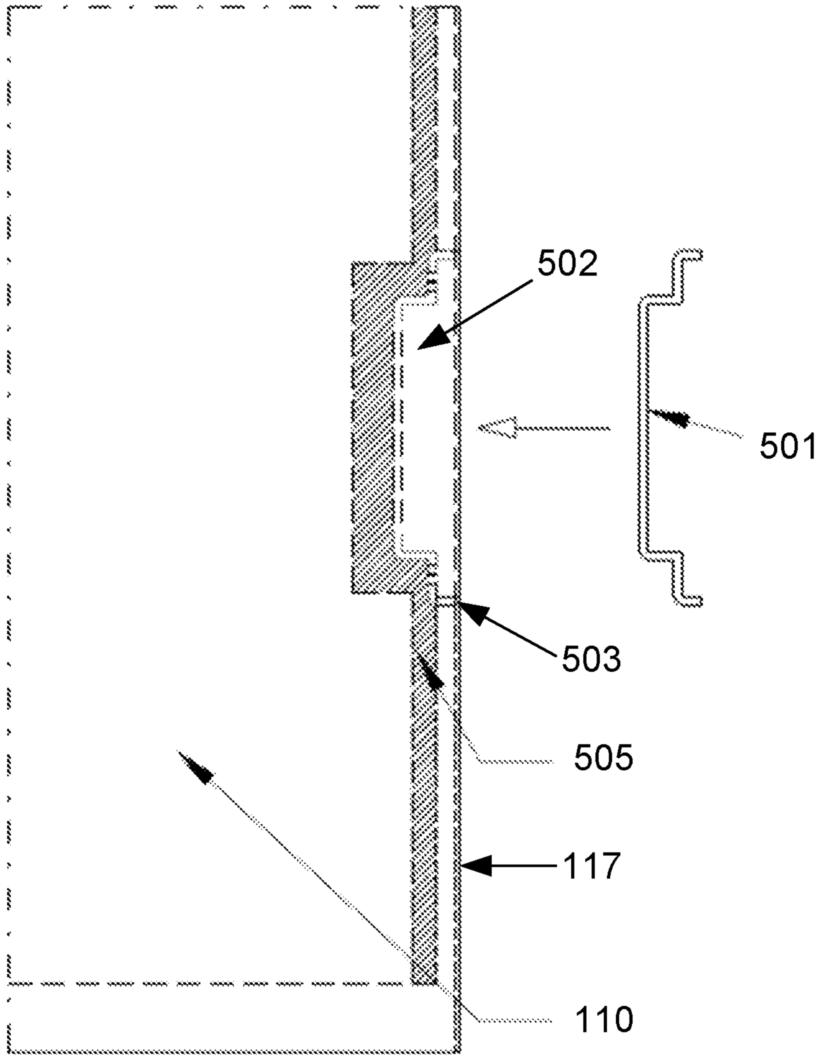
FIG. 6B shows an exploded view of the door hinge bracket of FIG. 6A installed in a door slab.

FIG. 6A shows a door hinge bracket 501 that is used in a door hinge assembly 500 according to an embodiment of the present technology. FIG. 6B shows the door hinge bracket 501 installed on the door slab 110. However, features of the embodiments of the hinge assembly 500 are used with other types of doors and door systems in other embodiments. In some embodiments, hinge bracket 501 is installed in a hinge pocket 502 of door slab 110 such that the distal ends 503 of the hinge bracket 501 are approximately flush with the side edge 117 of the outer skin 111 of the door slab 110. Thus, the hinge bracket 501 is concealed in the hinge pocket 502. In some embodiments, the hinge bracket 501 is installed in the hinge pocket 502 via fasteners (e.g., screws, nails, etc.) inserted through mounting holes 504 in the hinge bracket 501. In some embodiments, the hinge pocket 502 includes a damping fill 505. In some embodiments, the damping fill 505 is the same material as the damping fill 112 inside the door slab 110, as described above. In some embodiments, the damping fill 505 spans substantially the entire height and substantially the entire thickness of the door slab 110. In the embodiment shown, the vibration damping silicone (damping fill 505) is injected into the space between the hinge bracket 501, door outer skin 111, and the constrained dampener sheet 113 in the interior of the door slab 110. The result is a vibration isolated connection between the door slab 110 and the door hinge bracket 501. The connection also provides a shock load isolation point to dissipate the force that would normally be imparted into the hinge assembly 500. The effectiveness of this system was confirmed when an embodiment of the sound damping door system 1000 was placed on a swing tester and subjected to 375,000 cycles with no wear or damage to the door 100, hinge assemblies 500, compression seal 300, or frame 200. In some embodiments, the damping fill 505 also provides a homogenous seal between the interior of the door slab 110 and the concealed hinge bracket 501, resulting in minimal-to-no noise flanking into the interior of the door slab as typically found in the prior art designs.

FIG. 7A-7C show a door frame 200 according to an embodiment of the present technology installed in a rough door opening 13. The door frame 200 has a male frame 201 in contact with a first wall face 14, and a female frame 202 in contact with a second wall face 15. Slotted angle brackets 203 are used to mount the male frame 201 and the female frame 202 both to the wall defining the rough door opening 13 and to each other. In some embodiments, the male and female frames 201/202 are indirectly attached to the wall via the angle brackets 203. In some embodiments, the male and female frames 201/202 each have a section that wraps around the wall defining the rough door opening 13 and is in contact with the first and second wall faces 14/15, respectively. In some embodiments, the door frame 200 is adapted to receive a door 100 as part of a sound damping door system 1000. However, features of the embodiments of the door frame 200 are used with other types of doors and door systems in other embodiments.

In some embodiments, the male and female frames 201/202 are also fastened together via an isolation system 204, as shown in FIGS. 7A-7B. Preferably, the isolation system 204 improves the isolation between the male and female frames 201/202 of the frame 200 for isolating wall systems. Isolation system 204 includes an isolation gasket 205 that limits noise conduction between the male and female frames 201/202. In some embodiments, the gasket 205 decouples the male frame 201 (push side) acoustically from the female frame 202 (pull side). In some embodiments, the isolation system 204 includes a fastener isolation grommet 206 that further isolates the fastener from the male frame 201. In some embodiments, the gasket 205 and grommet 206 are formed of a silicone material having a durometer of Shore 30 A.

Figure 8:
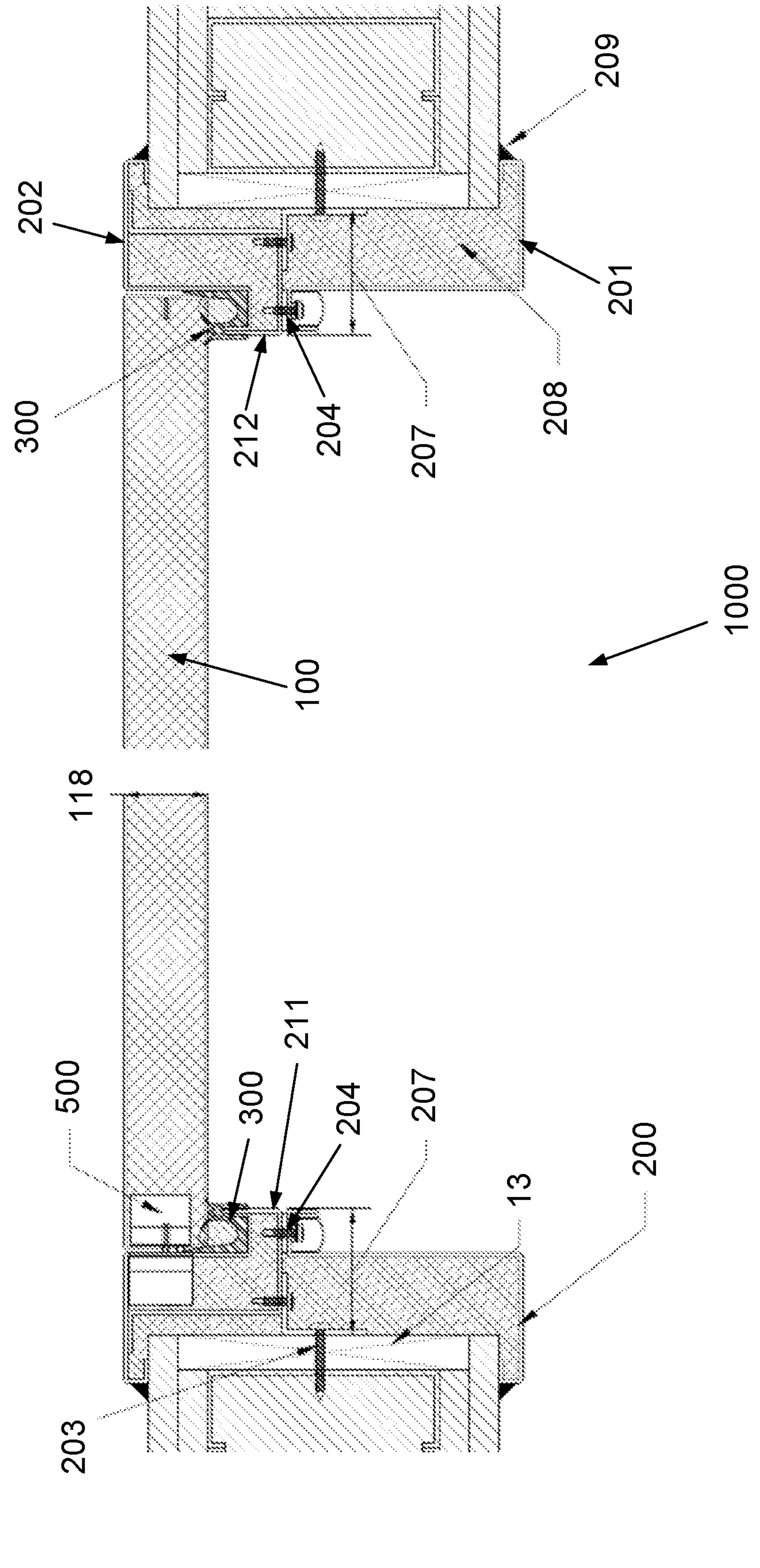
FIGS. 8-9 show cross-section views of a sound damping door system according to an embodiment of the present technology.
Figure 9:
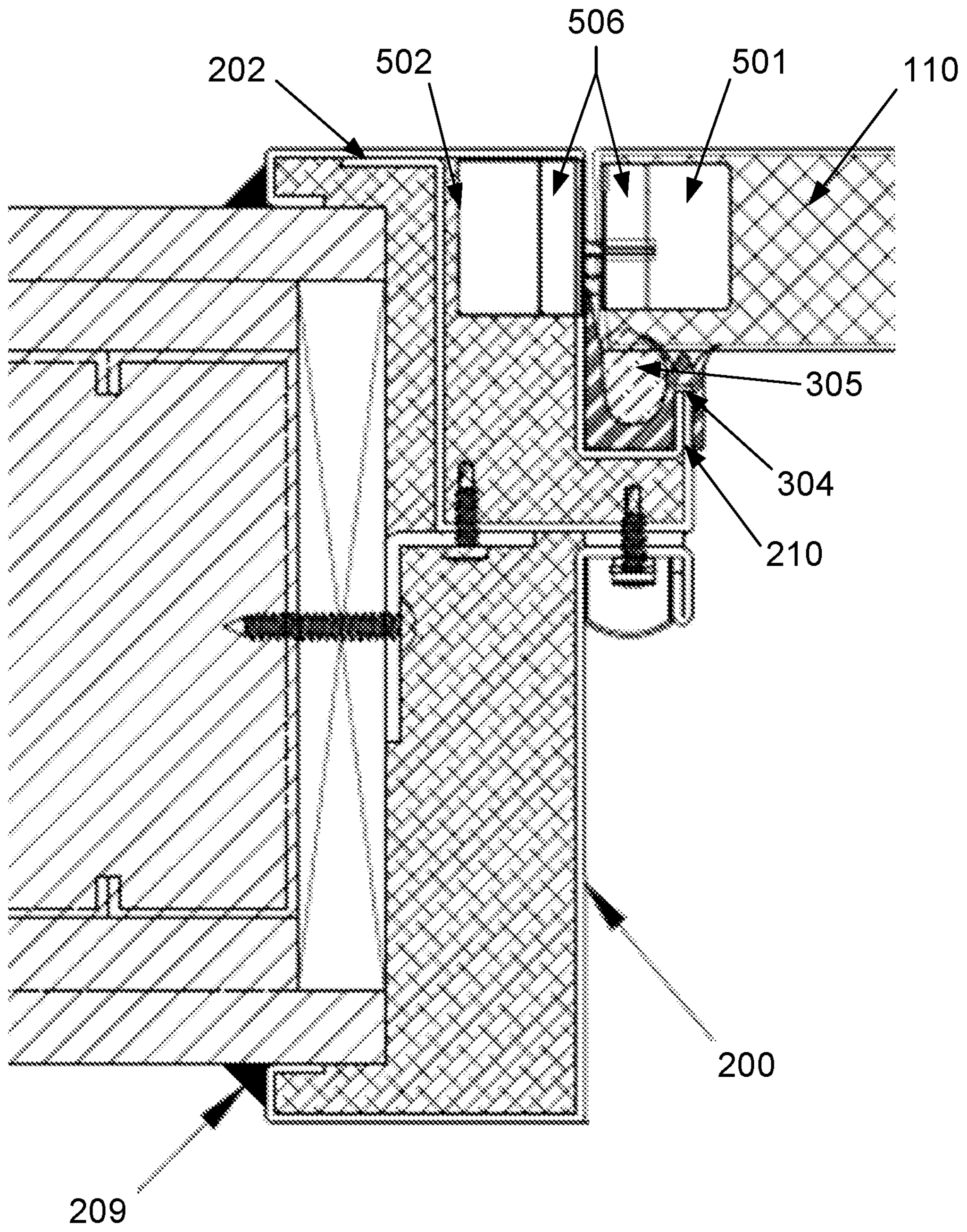
Figure 10:
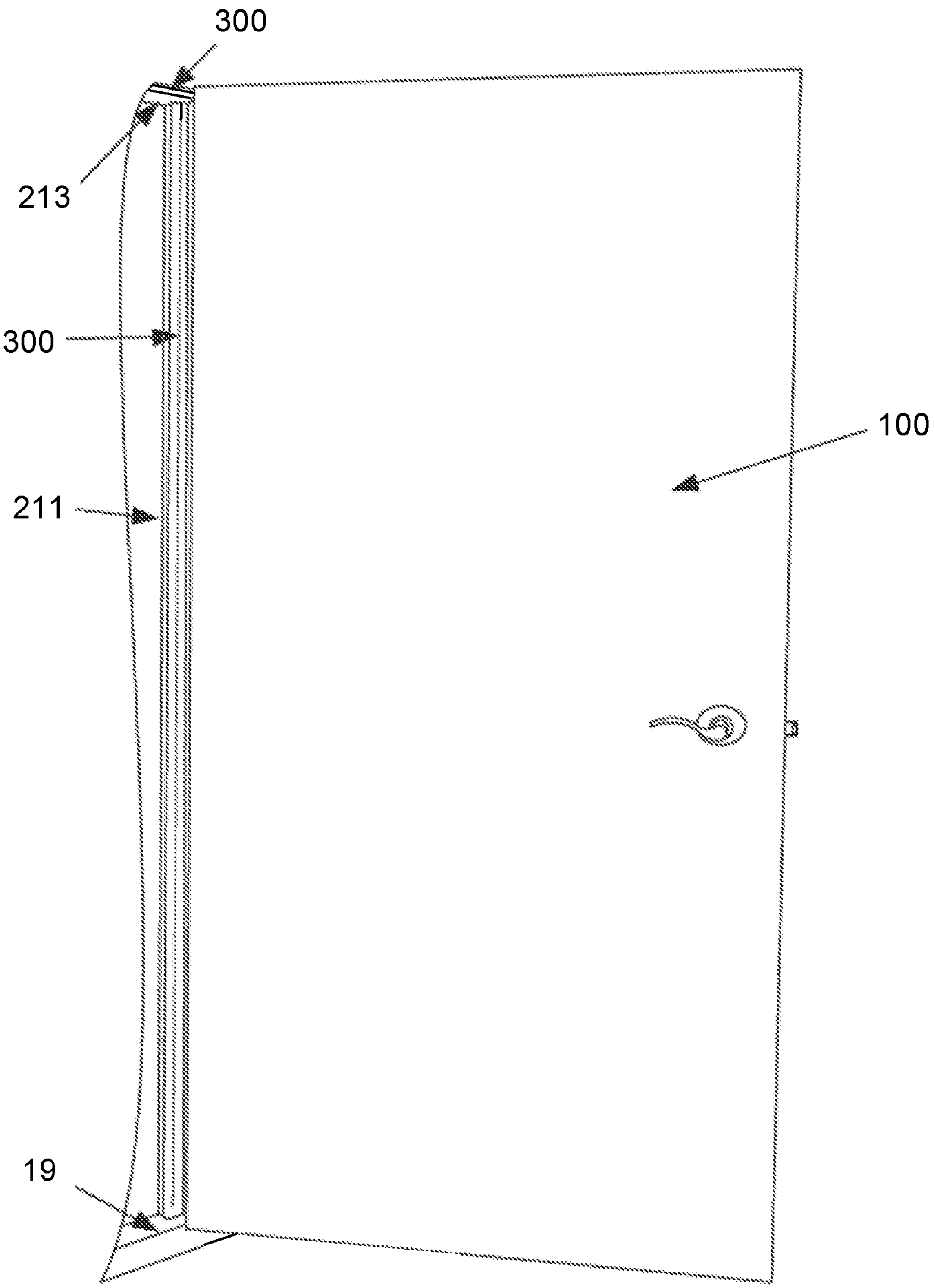
FIG. 10 shows an isometric view of a sound damping door system according to an embodiment of the present technology.

FIGS. 8-9 show cross-section views of a sound damping door system 1000 according to an embodiment of the present technology. FIG. 10 shows an isometric view of the sound damping door system 1000 according to an embodiment of the present technology. The sound damping door system 1000 includes a door frame 200 fastened to the wall defining rough door opening 13 via the angle brackets 203. The door frame 200 has a thickness 207, which in some embodiments is 2.625 inches, and different dimensions in other embodiments. In some embodiments, the door frame 200 includes a sill seal 208 packed within the male and female frames 201/202. The sill seal 208 is preferably used in embodiments having large gaps within the frame 200, and is not required in embodiments having a tight fitting frame 200. In some embodiments, the sill seal 208 is a fiberglass material. In some embodiments, the door frame 200 includes an acoustic sealant 209 around the perimeter of the frame 200. In some embodiments, the acoustic sealant 209 is a non-hardening sealant material.

In some embodiments, the sound damping door 100 is mounted to a frame 200 via a hinge assembly 500. In some embodiments, the hinge assembly 500 includes a hinge bracket 501 installed and concealed in a hinge pocket 502 of the door slab 110, as discussed above. In the same manner, a corresponding hinge bracket 501 is installed and concealed in a hinge pocket 502 of the female frame 202. In other embodiments, the corresponding hinge bracket 501 is installed in a hinge pocket 502 of the male frame 201.

Figure 11:
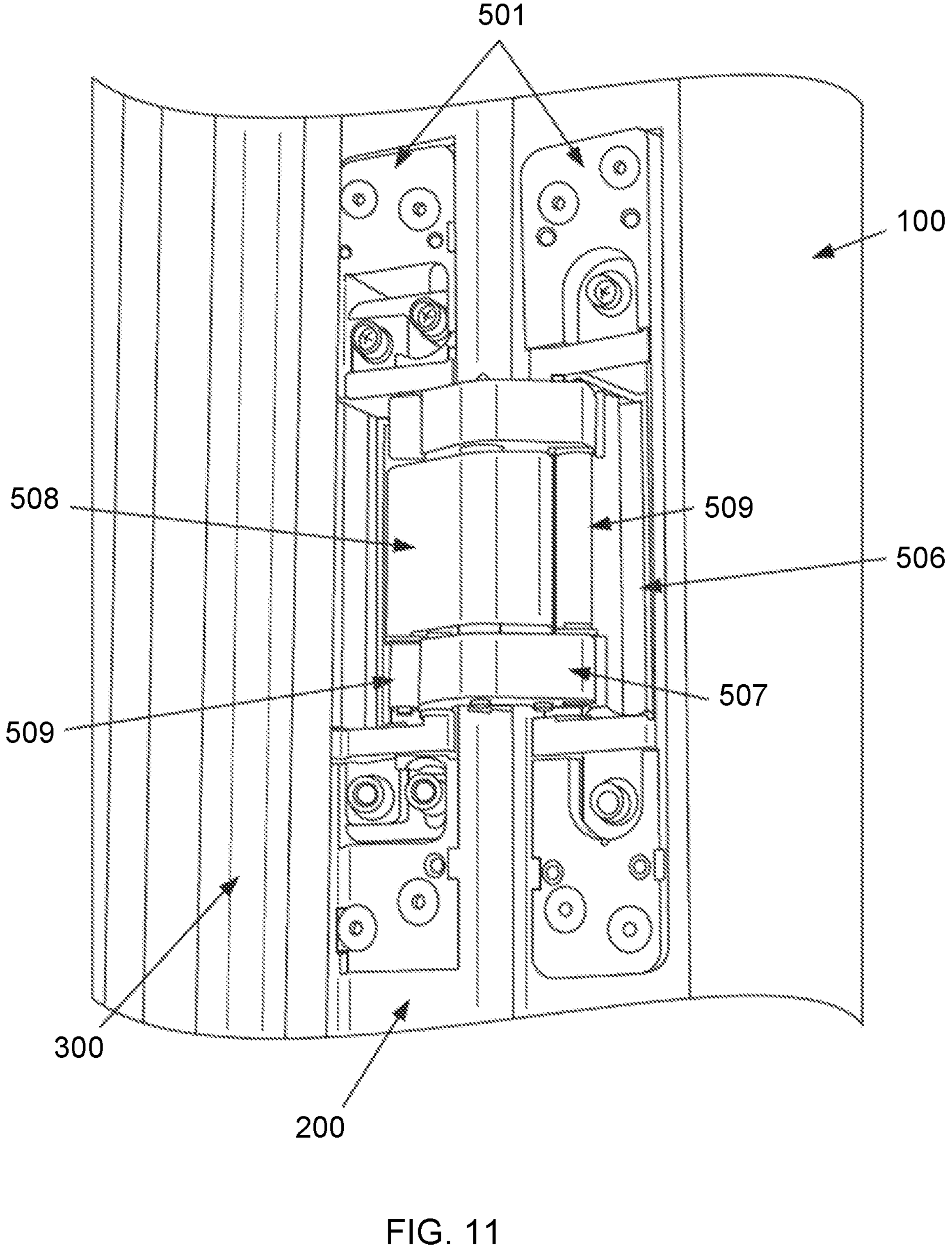
FIG. 11 shows a hinge assembly according to an embodiment of the present technology.

Preferably, a swing hinge 506 connects the two hinge brackets 501, as shown in FIG. 11. In some embodiments, hinge 506 has one or more door wings 507 connected to a frame wing 508 via one or more pins 509. The wings 507/508 rotate about the pins 509 to permit the door 100 to swing out from the frame 200. In preferred embodiments, all components of the hinge 506 (such as the wings 507/508 and pins 509) are adapted to be concealed within the hinge brackets 501 when the door 100 is in a closed position, as shown in FIG. 9.

In some embodiments, a compression seal 300, 300' is mounted to the door frame 200 via mounting slot 204 that encapsulates a mounting edge or protrusion 210 of the female frame 202. In some embodiments, the compression seal 300, 300' is mounted to a mounting edge or protrusion 210 of the male frame 201. As discussed above, the compression seal 300, 300' is preferably retained in the frame 200 by the constant pressure provided by the cylindrical strip 305 of the compression seal 300, 300'. In preferred embodiments, the compression seal 300, 300' provides a continuous compression seal at the frame hinge jamb 211, the frame strike jamb 212, and the frame head 213, such that the compression seal 300, 300' spans the perimeter of the door frame 200, as shown in FIGS. 8-10. In some embodiments, a separate compression seal 300, 300' is mounted to the frame 200 along each jamb/head section 211/212/213, and the compression seals 300, 300' create a flush seal at the jamb-to-head interfaces. In some embodiments, a continuous compression seal 300, 300' spans the perimeter of the frame 200. In some embodiments, the sound damping door system 1000 includes the bottom door seal 400. In some embodiments, the bottom door seal 400 and the compression seal 300, 300' form a continuous sound damping seal along the perimeter of the door 100 to further improve the effectiveness of the sound damping door system 1000. In some embodiments, the sound damping door system 1000 includes a floor surface or threshold 19.

Although the technology has been described and illustrated with respect to example embodiments thereof, it should be understood by those skilled in the art that the foregoing and various other changes, omissions, and additions may be made there and thereto, without departing from the spirit and scope of the present technology. For example, although embodiments of the present technology have been described with reference to a sound damping door system having the components and their respective features as described above, the present technology is not limited thereto. Indeed, the present technology contemplates separate embodiments directed to each of the individual components described above, as well as any possible combination of the components used in a door, door system, or door kit.

What is claimed is:

1. A door seal system, comprising:

a seal, comprising a first damping component comprising a plurality of shaped surfaces, and a second damping component, the second damping component is at least partially enclosed in the first damping component, wherein two of the plurality of shaped surfaces partially surround the second damping component such that, when a door compresses the seal, the second damping component remains partially enclosed by the two shaped surfaces such that a gap remains between the shaped surfaces; and a door bottom seal, comprising:

a seal pan;

a pressure member at least partially disposed in the seal pan;

a sealing strip attached to a bottom surface of the seal pan; and a dampening material disposed in the seal pan.

2. The door seal of claim 1, wherein the first damping component only partially surrounds the second damping component such that, when a door compresses the seal, the first damping component does not completely surround the second damping component.

3. The door seal of claim 1, wherein when the seal is in a compressed position, the second damping component remains partially enclosed by at least two of the plurality of shaped surfaces such that a gap remains between the shaped surfaces, with the size of the gap determining the band-pass filter frequency response, and the compressed seal dissipates noise in a frequency bandwidth of 500 Hz to 4,000 Hz.

4. The door bottom seal of claim 1, further comprising a low-friction fabric cover layer disposed on a bottom surface of the sealing strip.

5. The door bottom seal of claim 1, further comprising at least one mounting slot for mounting the seal to a door such that the seal is permitted to move relative to the door, wherein the bottom seal is rotatable about at least one of a longitudinal axis thereof and a lateral axis thereof.

6. A door seal system, comprising:

a seal, comprising a first damping component comprising a plurality of shaped surfaces, and a second damping component, the second damping component is at least partially enclosed in the first damping component; and a door bottom seal, comprising:

a seal pan;

a pressure member at least partially disposed in the seal pan;

a sealing strip attached to a bottom surface of the seal pan; and a dampening material disposed in the seal pan;

wherein the bottom seal is rotatable about at least one of a longitudinal axis thereof and a lateral axis thereof.

* * * * *